United States Patent
Seshimo et al.

(10) Patent No.: US 9,567,477 B2
(45) Date of Patent: Feb. 14, 2017

(54) UNDERCOAT AGENT AND METHOD OF PRODUCING STRUCTURE CONTAINING PHASE-SEPARATED STRUCTURE

(71) Applicant: Tokyo Ohka Kogyo Co., Ltd., Kawasaki-shi (JP)

(72) Inventors: Takehiro Seshimo, Kawasaki (JP); Tasuku Matsumiya, Kawasaki (JP); Takaya Maehashi, Kawasaki (JP); Takahiro Dazai, Kawasaki (JP); Yoshiyuki Utsumi, Kawasaki (JP)

(73) Assignee: TOKYO OHKA KOGYO CO., LTD., Kawasaki-Shi (JP)

(*) Notice: Subject to any disclaimer, the term of this patent is extended or adjusted under 35 U.S.C. 154(b) by 129 days.

(21) Appl. No.: 14/324,493

(22) Filed: Jul. 7, 2014

(65) Prior Publication Data
US 2015/0030773 A1    Jan. 29, 2015

(30) Foreign Application Priority Data
Jul. 24, 2013   (JP) .................................. 2013-153870

(51) Int. Cl.
    *C09D 133/12*      (2006.01)
    *C09D 125/16*      (2006.01)
    (Continued)

(52) U.S. Cl.
    CPC ........... *C09D 133/12* (2013.01); *C08F 212/08* (2013.01); *C08F 230/08* (2013.01); *C09D 125/14* (2013.01); *C09D 125/16* (2013.01); *C09D 153/02* (2013.01)

(58) Field of Classification Search
    None
    See application file for complete search history.

(56) References Cited

U.S. PATENT DOCUMENTS

2009/0189317 A1   7/2009  Sato et al.
2009/0263631 A1   10/2009 Sakamoto et al.

FOREIGN PATENT DOCUMENTS

JP    A-2007-072374    3/2007
JP    A-2007-329276    12/2007
        (Continued)

OTHER PUBLICATIONS

Hirai et al.; One-Step Direct-Patterning Template Utilizing Self-Assembly of POSS-Containing Block Copolymers; Adv. Mater. 2009, 21, 4334-4338.*

(Continued)

*Primary Examiner* — Michael P Rodriguez
(74) *Attorney, Agent, or Firm* — Knobbe Martens Olson & Bear LLP

(57) ABSTRACT

An undercoat agent used for phase separating a layer containing a block copolymer having a block of a structural unit derived from an (α-substituted) acrylate ester on a substrate, and which contains a resin component including a structural unit represented by formula (ba0-1), and/or a structural unit represented by formula (ba0-2), and a structural unit (ba0-3) having a substrate interacting group, (ba0-1)

(Continued)

-continued

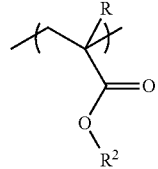

(ba0-2)

wherein R represents a hydrogen atom, an alkyl group of 1 to 5 carbon atoms or a halogenated alkyl group of 1 to 5 carbon atoms, $R^1$ and $R^2$ represent a halogen atom or an organic group of 1 to 20 carbon atoms which may contain an oxygen atom, a halogen atom, or a silicon atom, and n is 1 to 5.

4 Claims, 1 Drawing Sheet

(51) Int. Cl.
  C09D 125/14  (2006.01)
  C08F 212/08  (2006.01)
  C08F 230/08  (2006.01)
  C09D 153/02  (2006.01)

(56) References Cited

FOREIGN PATENT DOCUMENTS

| JP | 2008036491 A * | 2/2008 |
| JP | A-2008-036491 | 2/2008 |
| JP | A-2008-246876 | 10/2008 |

OTHER PUBLICATIONS

Ryu et al.; Surface Modification with Cross-Linked Random Copolymers: Minimum Effective Thickness; Macromolecules, 2007, 40, 4296-4300.*

William Hinsberg et al.; Self-Assembling Materials for Lithographic Patterning: Overview, Status and Moving Forward; Proceedings of SPIE, (2010) vol. 7637, 76370G-1.

* cited by examiner

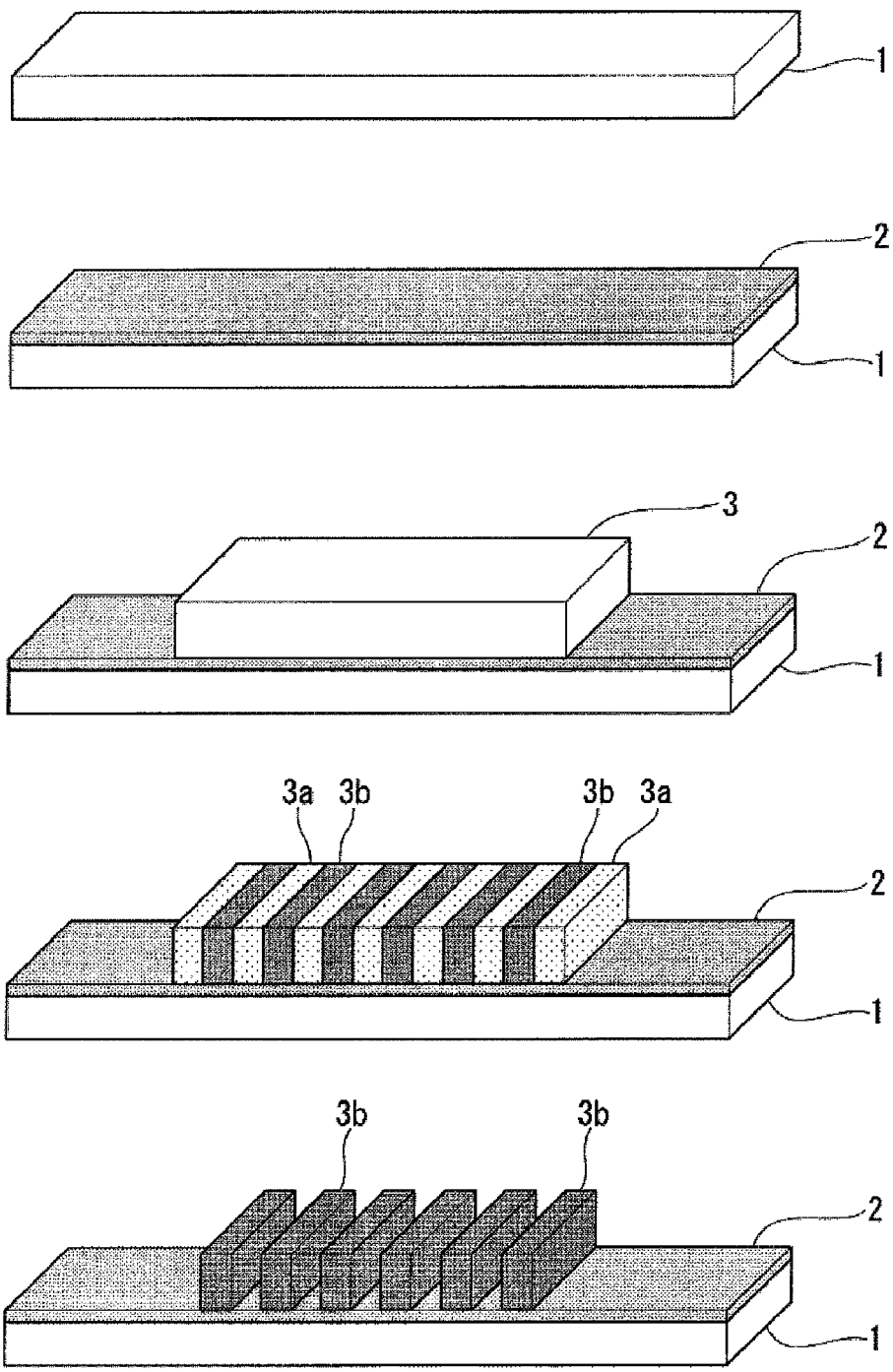

UNDERCOAT AGENT AND METHOD OF PRODUCING STRUCTURE CONTAINING PHASE-SEPARATED STRUCTURE

CROSS-REFERENCE TO RELATED APPLICATIONS

This application claims priority to Japanese Patent Application No. 2013-153870, filed Jul. 24, 2013, the entire content of which is incorporated herein by reference.

BACKGROUND OF THE INVENTION

Field of the Invention

The present invention relates to an undercoat agent and a method of producing a structure containing a phase-separated structure.

Background Art

In recent years, the continued miniaturization of large scale integrated circuits (LSI) has led to demands for techniques capable of processing ever finer structures. In response to the demands, testing has commenced into the formation of finer patterns using phase-separated structures that are formed by the self-assembly of a block copolymer containing mutually incompatible blocks bonded together. (For an example, refer to JP-A-2008-36491).

To utilize the aforementioned type of phase-separated structure of a block copolymer, a self-assembled nanostructure formed by microphase separation must be formed only within a specific region, and must be oriented in the desired direction. To achieve this positional control and orientation control, processes such as graphoepitaxy, which controls the phase-separated pattern using a guide pattern, and chemical epitaxy, which controls the phase-separated pattern based on differences in the chemical state of the substrate, have been proposed (for an example, refer to Proceedings of SPIE, V. 7637, 76370G-1(2010)).

In the chemical epitaxy process, a neutralization film containing a surface treatment agent which has affinity with any of the blocks that constitute the block copolymer is disposed on the substrate surface in a predetermined pattern. By the pattern (guide pattern) of the neutralization film disposed on the substrate surface, orientation of each phase of the phase-separated structure is controlled. Therefore, to form a predetermined phase-separated structure, it is important to dispose the neutralization film in accordance with a period of the block copolymer.

For these block copolymers, block copolymers having a block formed from a repeating unit of a styrene and a block formed from a repeating unit of methyl methacrylate (PS-b-PMMA) are being widely investigated, and it is claimed that PS-b-PMMA is a material that can be used in the formation of very fine patterns down to approximately 13 nm.

Additionally, investigations are currently also being conducted into pattern formation methods using Si-containing block copolymers, which have been identified as materials potentially capable of realizing the formation of patterns of even finer dimensions. Block copolymer layers formed using these Si-containing block copolymers have low surface energy.

SUMMARY OF THE INVENTION

In the pattern formation methods using block copolymers having different surface energy as described above, an undercoat agent by which a good pattern is obtained by phase separation of each block copolymer has been required.

The present invention has been developed in light of the above circumstances, and has an object of providing an undercoat agent which can produce a substrate with a nanostructure of which a position and orientation are freely designed on the substrate surface using phase separation of a block copolymer and a method of producing a structure containing a phase-separated structure using the undercoat agent.

According to a first aspect of the present invention, there is provided an undercoat agent which is used for phase separating a layer containing a block copolymer having a block of a structural unit derived from an (α-substituted) acrylate ester on a substrate, and which contains a resin component, in which the resin component includes a structural unit represented by the following general formula (ba0-1), and/or a structural unit represented by the following general formula (ba0-2), and a structural unit (ba0-3) having a substrate interacting group.

[Chemical formula 1]

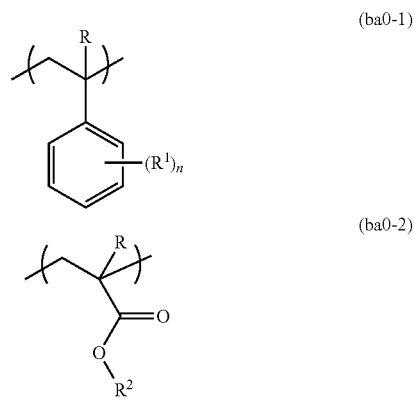

[In the formula (ba0-1), R represents a hydrogen atom, an alkyl group of 1 to 5 carbon atoms or a halogenated alkyl group of 1 to 5 carbon atoms, $R^1$ represents a halogen atom, or a linear, branched, or cyclic organic group of 1 to 20 carbon atoms which may contain an oxygen atom, a halogen atom, or a silicon atom, or an organic group obtained by combining these, and n is an integer of 1 to 5.

In the formula (ba0-2), R represents a hydrogen atom, an alkyl group of 1 to 5 carbon atoms or a halogenated alkyl group of 1 to 5 carbon atoms, $R^2$ represents a linear, branched, or cyclic organic group of 1 to 20 carbon atoms which may contain an oxygen atom, a fluorine atom, or a silicon atom, or an organic group obtained by combining these.]

According to a second aspect of the present invention, there is provided a method of forming a structure containing a phase-separated structure having a step of forming a layer formed of the undercoat agent by coating the undercoat agent of the first aspect, thereafter, a step of forming a layer containing a block copolymer having a block of a structural unit derived from an (α-substituted) acrylate ester on the layer formed of the undercoat agent, and a step of phase-separating the layer containing the polymer.

According to the present invention, an undercoat agent which can produce a substrate with a nanostructure of which a position and orientation are freely designed on the substrate surface using phase separation of a block copolymer and a method of producing a structure containing a phase-separated structure using the undercoat agent can be provided.

In the present specification and the claims, the term "aliphatic" is a relative concept used in relation to the term "aromatic", and defines a group or compound or the like that has no aromaticity.

The term "alkyl group" includes linear, branched and cyclic monovalent saturated hydrocarbon groups, unless specified otherwise.

The term "alkylene group" includes linear, branched and cyclic divalent saturated hydrocarbon groups, unless specified otherwise. This definition also applies to the alkyl group within an alkoxy group.

A "halogenated alkyl group" is a group in which a part or all of the hydrogen atoms of an alkyl group have each been substituted with a halogen atom, wherein examples of the halogen atom include a fluorine atom, a chlorine atom, a bromine atom and an iodine atom.

A "fluorinated alkyl group" or a "fluorinated alkylene group" is a group in which a part or all of the hydrogen atoms of an alkyl group or alkylene group have each been substituted with a fluorine atom.

The term "structural unit" refers to a monomer unit that contributes to the formation of a polymeric compound (a resin, polymer or copolymer).

The expression "structural unit derived from an acrylate ester" refers to a structural unit that is formed by the cleavage of the ethylenic double bond of an acrylate ester.

An "acrylate ester" is a compound in which the hydrogen atom at the carboxyl group terminal of acrylic acid ($CH_2$=CH—COOH) has been substituted with an organic group.

In an acrylate ester, the hydrogen atom bonded to the carbon atom on the α-position may be substituted with a substituent. This substituent for substituting the hydrogen atom bonded to the carbon atom on the α-position is an atom or group other than a hydrogen atom, and examples include an alkyl group of 1 to 5 carbon atoms, a halogenated alkyl group of 1 to 5 carbon atoms, and a hydroxyalkyl group. Moreover, the carbon atom on the α-position of an acrylate ester refers to the carbon atom to which the carbonyl group is bonded, unless specified otherwise.

Hereafter, an acrylate ester in which the hydrogen atom bonded to the carbon atom on the α-position has been substituted with a substituent is sometimes referred to as a "α-substituted acrylate ester". Further, the generic term "(α-substituted) acrylate ester" may be used to describe both the acrylate ester and the α-substituted acrylate ester.

The expression "structural unit derived from a hydroxystyrene or hydroxystyrene derivative" refers to a structural unit that is formed by the cleavage of the ethylenic double bond of a hydroxystyrene or a hydroxystyrene derivative.

The term "hydroxystyrene derivative" is a generic term that includes both compounds in which the α-position hydrogen atom of a hydroxystyrene has been substituted with another substituent such as an alkyl group or a halogenated alkyl group, as well as derivatives thereof. Examples of these derivatives include compounds in which the hydrogen atom of the hydroxyl group of a hydroxystyrene, in which the α-position hydrogen atom may be substituted with a substituent, has been substituted with an organic group, and compounds in which a substituent other than a hydroxyl group is bonded to the benzene ring of a hydroxystyrene in which the α-position hydrogen atom may be substituted with a substituent. Furthermore, unless stated otherwise, the α-position (the carbon atom on the α-position) refers to the carbon atom to which the benzene ring is bonded.

Examples of the substituent which may substitute the α-position hydrogen atom of a hydroxystyrene include the same substituents as those described above as the α-position substituent in the above-described α-substituted acrylate ester.

The expression "structural unit derived from a vinylbenzoic acid or vinylbenzoic acid derivative" refers to a structural unit that is formed by the cleavage of the ethylenic double bond of a vinylbenzoic acid or a vinylbenzoic acid derivative.

The term "vinylbenzoic acid derivative" is a generic term that includes both compounds in which the α-position hydrogen atom of a vinylbenzoic acid has been substituted with another substituent such as an alkyl group or a halogenated alkyl group, as well as derivatives thereof. Examples of these derivatives include compounds in which the hydrogen atom of the carboxyl group of a vinylbenzoic acid, in which the α-position hydrogen atom may be substituted with a substituent, has been substituted with an organic group, and compounds in which a substituent other than a hydroxyl group or a carboxyl group is bonded to the benzene ring of a vinylbenzoic acid in which the α-position hydrogen atom may be substituted with a substituent. Furthermore, unless stated otherwise, the α-position (the carbon atom on the α-position) refers to the carbon atom to which the benzene ring is bonded.

The term "styrene" is a generic term that includes styrene, and compounds in which the α-position hydrogen atom of styrene has been substituted with another substituent such as an alkyl group or a halogenated alkyl group.

The expressions "structural unit derived from a styrene" and "structural unit derived from a styrene derivative" refer to structural units that are formed by the cleavage of the ethylenic double bond of a styrene or a styrene derivative. The alkyl group as the α-position substituent is preferably a linear or branched alkyl group, and specific examples include a methyl group, an ethyl group, a propyl group, an isopropyl group, an n-butyl group, an isobutyl group, a tert-butyl group, a pentyl group, an isopentyl group and a neopentyl group.

In addition, specific examples of the halogenated alkyl group as the α-position substituent include groups in which a part or all of the hydrogen atoms of the above-described "alkyl group as the α-position substituent" have each been substituted with a halogen atom. Examples of the halogen atom include a fluorine atom, chlorine atom, bromine atom and iodine atom, and a fluorine atom is particularly desirable.

In addition, specific examples of the hydroxyalkyl group as the α-position substituent include groups in which a part or all of the hydrogen atoms of the above-described "alkyl group as the α-position substituent" have each been substituted with a hydroxyl group. The number of hydroxyl groups in the hydroxyalkyl group is preferably 1 to 5, and is most preferably 1.

The term "exposure" is used as a general concept that includes irradiation with any form of radiation.

BRIEF DESCRIPTION OF THE DRAWING

FIG. 1 is a schematic process diagram describing an example of a second aspect to the present invention.

DETAILED DESCRIPTION OF THE INVENTION

Undercoat Agent

The undercoat agent of the present invention is used for phase separating a layer containing a block copolymer having a block of a structural unit derived from an (α-substituted) acrylate ester on a substrate, and contains a resin component which includes a structural unit represented by the following general formula (ba0-1), and/or a structural unit represented by the following general formula (ba0-2), and the structural unit (ba0-3) having the substrate interacting group.

[Chemical formula 2]

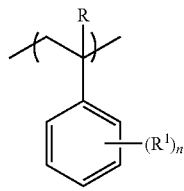

(ba0-1)

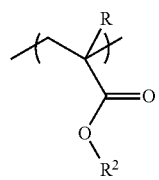

(ba0-2)

In the formula (ba0-1), R represents a hydrogen atom, an alkyl group of 1 to 5 carbon atoms or a halogenated alkyl group of 1 to 5 carbon atoms, $R^1$ represents a halogen atom, or a linear, branched, or cyclic organic group of 1 to 20 carbon atoms which may contain an oxygen atom, a halogen atom, or a silicon atom, or an organic group obtained by combining these, and n is an integer of 1 to 5.

In the formula (ba0-2), R represents a hydrogen atom, an alkyl group of 1 to 5 carbon atoms or a halogenated alkyl group of 1 to 5 carbon atoms, $R^2$ represents a linear, branched, or cyclic organic group of 1 to 20 carbon atoms which may contain an oxygen atom, a fluorine atom, or a silicon atom, or an organic group obtained by combining these.

Resin Component (A)

The undercoat agent of the present invention contains a resin component (hereinafter, also referred to as "resin component (A)") which includes a structural unit represented by the general formula (ba0-1), and/or a structural unit represented by the general formula (ba0-2), and the structural unit (ba0-3) having the substrate interacting group.

In the present specification and claims, "resin component" refers to a polymer having a molecular weight greater than or equal to 1,000. As the molecular weight of the polymer, a mass average molecular weight in terms of polystyrene measured by gel permeation chromatography (GPC) is used.

Structural Unit Represented by the General Formula (Ba0-1)

The structural unit represented by the general formula (ba0-1) (hereinafter, referred to as "structural unit (ba0-1)") will be described.

The general formula (ba0-1) is shown below.

[Chemical formula 3]

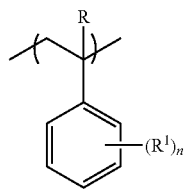

(ba0-1)

In the formula (ba0-1), R represents a hydrogen atom, an alkyl group of 1 to 5 carbon atoms or a halogenated alkyl group of 1 to 5 carbon atoms, $R^1$ represents a halogen atom, or a linear, branched, or cyclic organic group of 1 to 20 carbon atoms which may contain an oxygen atom, a halogen atom, or a silicon atom, or an organic group obtained by combining these, and n is an integer of 1 to 5.

In the formula (ba0-1), R represents a hydrogen atom, an alkyl group of 1 to 5 carbon atoms, or a halogenated alkyl group of 1 to 5 carbon atoms.

The alkyl group of 1 to 5 carbon atoms for R is preferably a linear or branched alkyl group of 1 to 5 carbon atoms, and specific examples include a methyl group, ethyl group, propyl group, isopropyl group, n-butyl group, isobutyl group, tert-butyl group, pentyl group, isopentyl group and neopentyl group. The halogenated alkyl group of 1 to 5 carbon atoms is a group in which a part or all of the hydrogen atoms of the above-described alkyl group of 1 to 5 carbon atoms have each been substituted with a halogen atom. Examples of the halogen atom include a fluorine atom, chlorine atom, bromine atom and iodine atom, and a fluorine atom is particularly preferable.

R is preferably a hydrogen atom, an alkyl group of 1 to 5 carbon atoms or a fluorinated alkyl group of 1 to 5 carbon atoms, and from the viewpoint of ease of industrial availability, is most preferably a hydrogen atom or a methyl group.

In the formula (ba0-1), $R^1$ represents a halogen atom, or a linear, branched, or cyclic organic group of 1 to 20 carbon atoms which may contain an oxygen atom, a halogen atom, or a silicon atom, or an organic group obtained by combining these.

It is considered that by including $R^1$ in the formula (ba0-1), it is possible to adjust the free energy of the undercoat agent surface, to excellently phase-separate a layer containing a block copolymer which becomes an upper layer, and to excellently form a vertical lamellar pattern or a vertical cylinder pattern.

Examples of the halogen atom of $R^1$ preferably include a fluorine atom, a chlorine atom, or a bromine atom, and a fluorine atom is more preferable.

Examples of the organic group of $R^1$ preferably include a linear, branched, or cyclic alkyl group or aryl group.

As the alkyl group, an alkyl group of 1 to 20 carbon atoms is preferable, an alkyl group of 1 to 10 carbon atoms is more preferable, an alkyl group of 1 to 8 carbon atoms is still more preferable, an alkyl group of 1 to 6 carbon atoms is particularly preferable, and an alkyl group of 1 to 4 carbon atoms is most preferable. The alkyl group may be an alkyl group which is partially or fully fluorinated (hereinafter, also referred to as a fluorinated alkyl group), and an alkylsilyl group, an alkyl silyloxy group, or an alkoxy group in which carbon atoms of the alkyl group are substituted with silicon atoms or oxygen atoms. Moreover, the alkyl group partially fluorinated refers to an alkyl group in which part of the hydrogen atoms is substituted with a fluorine atom, and the alkyl group fully fluorinated refers to an alkyl group in which all of the hydrogen atoms is substituted with a fluorine atom.

As the aryl group, an aryl group of 4 to 20 carbon atoms is preferable, an aryl group of 4 to 10 carbon atoms is more preferable, and an aryl group of 6 to 10 carbon atoms is most preferable.

As $R^1$, in particular, a linear or branched alkyl group of 1 to 4 carbon atoms which does not have a substituent, a linear or branched alkoxy group of 1 to 4 carbon atoms, a fluorinated alkyl group of 1 to 4 carbon atoms, an alkylsilyl group of 1 to 6 carbon atoms, an alkyl silyloxy group of 1 to 6 carbon atoms, or an aryl group of 6 to 10 carbon atoms is preferable.

As the linear or branched alkyl group of 1 to 4 carbon atoms which does not have a substituent, a methyl group, an ethyl group, an isopropyl group, and a t-butyl, and among these, as $R^1$, the t-butyl group is particularly preferable.

As the linear or branched alkoxy group of 1 to 4 carbon atoms, a methoxy group, an ethoxy group, a t-butoxy group, and an isopropoxy group are preferable.

As the alkylsilyl group of 1 to 10 carbon atoms, a trialkylsilyl group or a trialkylsilyl alkyl group is preferable, and a trimethylsilyl group, a trimethylsilyl methyl group, a trimethylsilyl ethyl group, and a trimethylsilyl-n-propyl group are appropriately exemplified.

As the alkyl silyloxy group of 1 to 10 carbon atoms, a trialkyl silyloxy group or a trialkyl silyloxy alkyl group is preferable, and a trimethyl silyloxy group, a trimethyl silyloxy methyl group, a trimethyl silyloxy ethyl group, and a trimethyl silyloxy-n-propyl group are appropriately exemplified.

In the formula (ba0-1), n represents an integer of 1 to 5. In the present invention, n is preferably 1 to 3, and particularly preferably 1 to 2.

Specific examples of the structural unit represented by the formula (ba0-1) are shown below. In the following formulas, R is the same as the above.

[Chemical formula 4]

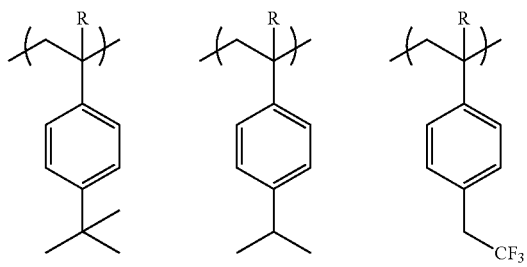

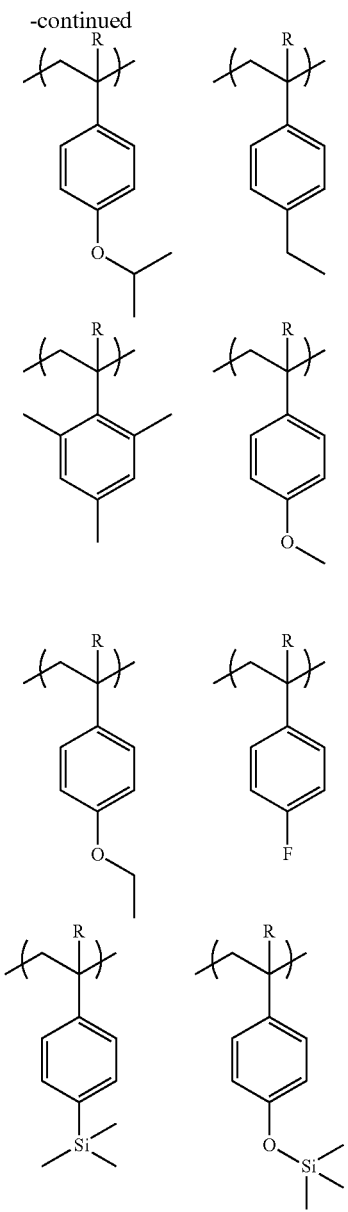

-continued

The structural unit (ba0-1) contained in the component (A) may be either 1 type, or 2 or more types.

In a case of only the structural unit (ba0-1) (in a case of not containing the structural unit (ba0-2)) in the component (A), the proportion of the structural unit (ba0-1) in the component (A) with respect to the total of all the structural units that constitute the component (A) is preferably greater than or equal to 80 mol %, more preferably greater than or equal to 85 mol %, further more preferably greater than or equal to 90 mol %, and particularly preferably greater than or equal to 95 mol %.

In a case of combining the structural unit (ba0-2) in the component (A), the total of the structural unit (ba0-1) and the structural unit (ba0-2) is preferably greater than or equal to 80 mol %, more preferably greater than or equal to 85 mol %, still more preferably greater than or equal to 90 mol %, and particularly preferably greater than or equal to 95 mol % with respect to the total of all the structural units that constitute the component (A), and the proportion of the structural unit (ba0-1) among these is preferably 5 to 95 mol %, and more preferably 10 to 90 mol % when the total of the structural unit (ba0-1) and the structural unit (ba0-2) is set to 100.

It is considered that by setting the proportion of the structural unit (ba0-1) to a lower limit value or greater, it is possible to optimize the surface energy of the undercoat agent surface with respect to a block copolymer of the upper layer, to excellently phase-separate a layer containing a block copolymer which becomes the upper layer, and to excellently form a vertical lamellar pattern or a vertical cylinder pattern.

Structural Unit Represented by the General Formula (Ba0-2)

The structural unit represented by the general formula (ba0-2) (hereinafter, referred to as "structural unit (ba0-2)") will be described.

The structural unit represented by the general formula (ba0-2) is shown below.

[Chemical formula 5]

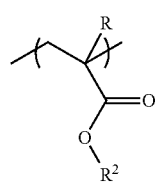

(ba0-2)

In the formula (ba0-2), R represents a hydrogen atom, an alkyl group of 1 to 5 carbon atoms or a halogenated alkyl group of 1 to 5 carbon atoms, $R^2$ represents a linear, branched, or cyclic organic group of 1 to 20 carbon atoms which may contain an oxygen atom, a fluorine atom, or a silicon atom, or an organic group obtained by combining these.

In the formula (ba0-2), R is the same as the above.

In formula (ba0-2), description of $R^2$ is the same as that of $R^1$ in the above-described formula (ba0-1).

The organic group of $R^2$ in the formula (ba0-2) among these is preferably a linear, branched, or cyclic alkyl group, and may be a fluorinated alkyl group.

In addition, in a case where $R^2$ includes a silicon atom, $R^2$ may further be an organic group including a polyhedral oligomeric silsesquioxane structure (preferably, the following general formula (a0-r-1)). That is, the formula (ba0-2) may be the following structural unit (a0-1), and as the following structural unit (a0-1), specifically, the following structural unit (a0-1-1) is preferable.

In addition, it is considered that by including the structural unit of the formula (a0-1) in the resin component of the undercoat agent, it is possible to easily adjust the surface energy, and to excellently form a vertical lamellar pattern or a vertical cylinder pattern.

Specific examples of the structural unit represented by the formula (ba0-2) are shown below. In the following formulas, R is the same as the above.

[Chemical formula 6]

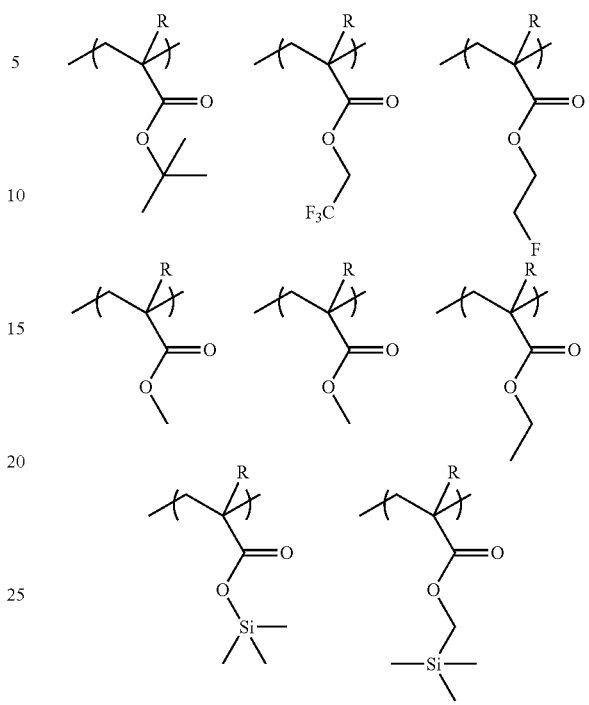

The structural unit (ba0-2) contained in the component (A) may be either 1 type, or 2 or more types.

In a case of only the structural unit (ba0-2) (in a case of not containing the structural unit (ba0-1)) in the component (A), the proportion of the structural unit (ba0-2) in the component (A) with respect to the total of all the structural units that constitute the component (A) is preferably greater than or equal to 80 mol %, more preferably greater than or equal to 85 mol %, further more preferably greater than or equal to 90 mol %, and particularly preferably greater than or equal to 95 mol %.

In a case of combining the structural unit (ba0-1) in the component (A), the total of the structural unit (ba0-1) and the structural unit (ba0-2) is preferably greater than or equal to 80 mol %, more preferably greater than or equal to 85 mol %, still more preferably greater than or equal to 90 mol %, and particularly preferably greater than or equal to 95 mol % with respect to the total of all the structural units that constitute the component (A), and the proportion of the structural unit (ba0-2) among these is preferably 5 to 95 mol %, and more preferably 10 to 90 mol % when the total of the structural unit (ba0-1) and the structural unit (ba0-2) is set to 100.

By setting the proportion of the structural unit (ba0-2) to a lower limit value or greater, it is possible to adjust the surface energy of the undercoat agent layer, to excellently phase-separate a layer containing a block copolymer which becomes the upper layer, and to excellently form a vertical lamellar pattern or a vertical cylinder pattern.

Structural Unit (Ba0-3) Having Substrate Interacting Group

The undercoat agent of the present invention includes a structural unit (ba0-3) (hereinafter, referred to as "structural unit (ba0-3)") having the substrate interacting group.

Substrate Interacting Group

It is considered that since the component (A) of the present invention has the substrate interacting group, an undercoat agent including the component (A) and a substrate interact, a strong film (a layer formed of the undercoat agent) is formed on the substrate, and as a result, a layer formed of a block copolymer is excellently phase-separated on a layer formed of the undercoat agent.

In the present invention, "group which can interact with the substrate" and "substrate interacting group" refers to a group which can chemically or physically interact with the substrate, and it is possible to appropriately select the group in accordance with the type of the substrate. Examples of the type of interaction between the substrate and the substrate interacting group include covalent interaction, ionic bonding interaction, hydrogen bonding interaction, electrostatic interaction, hydrophobic interaction, Van der Waals force bond.

As the substrate interacting group, specifically, a carboxy group, a hydroxyl group, a cyano group, an azido group, an amino group, a trialkoxysilyl group, a dialkoxysilyl group, or a monoalkoxy silyl group are exemplified, and among these, a carboxy group, a hydroxyl group, a cyano group, an amino group, or a trialkoxysilyl group is preferable. As the alkoxy group in the trialkoxysilyl groups, a methoxy group or ethoxy group is preferable, and the methoxy group is particularly preferable.

In addition, in the present invention, as the substrate interacting group, a lactone-containing cyclic group, groups represented by the following formula (ba0-3-1'-r1) to (ba0-3-1'-r2), an ether-containing cyclic group, and a cyclooctatrienyl group may also be appropriately exemplified.

The "lactone-containing cyclic group" refers to a cyclic group containing a ring (lactone ring) including —O—C(=O)— in the ring skeleton thereof. The lactone ring is counted as a first ring, in a case where the lactone-containing cyclic group has only a lactone ring, it is referred to as a monocyclic group, and in a case where the lactone-containing cyclic group has other ring structures, it is referred to as a polycyclic group regardless of the structure. The lactone-containing cyclic group may be a monocyclic group or a polycyclic group.

As the lactone-containing cyclic group as the substrate interacting group, which is not particularly limited, arbitrary lactone-containing cyclic group may be used. Specifically, groups represented by the following general formulas (lc-r-1) to (lc-r-7) are exemplified. Hereinafter, "*" represents a bond.

[Chemical formula 7]

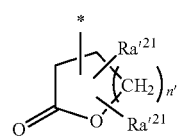
(lc-r-1)

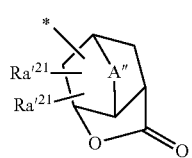
(lc-r-2)

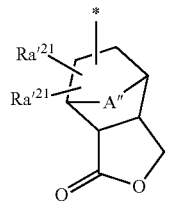
(lc-r-3)

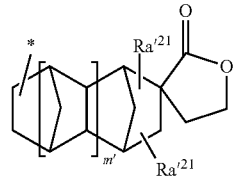
(lc-r-4)

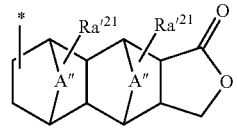
(lc-r-5)

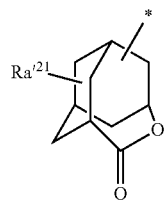
(lc-r-6)

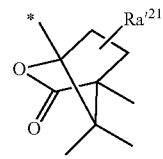
(lc-r-7)

In the formulas, each of $Ra'^{21}$ independently represents a hydrogen atom, an alkyl group, an alkoxy group, a halogen atom, a halogenated alkyl group, a hydroxyl group, —COOR", —OC(=O)R", a hydroxyalkyl group, or a cyano group; R" represents a hydrogen atom or an alkyl group; A" represents an alkylene group of 1 to 5 carbon atoms which may contains an oxygen atom or a sulfur atom, an oxygen atom, or a sulfur atom; n' is an integer of 0 to 2; and m' is an integer of 0 or 1.

Among the general formulas (lc-r-1) to (lc-r-7) described above, A" represents an alkylene group of 1 to 5 carbon atoms which may contain an oxygen atom (—O—) or a sulfur atom (—S—), an oxygen atom, or a sulfur atom. As the alkylene group of 1 to 5 carbon atoms in A", a linear or branched alkylene group is preferable, and a methylene group, an ethylene group, an n-propylene group, and an isopropylene group are exemplified. In a case where the alkylene group includes an oxygen atom or a sulfur atom, as the specific examples, a group in which —O— or —S— is interposed between the terminals or the carbon atoms of the alkylene group is exemplified, and the examples include —O—CH$_2$—, —CH$_2$—O—CH$_2$—, —S—CH$_2$—, and —CH$_2$—S—CH$_2$—. As A", an alkylene group of 1 to 5 carbon atoms or —O— is preferable, an alkylene group of 1 to 5 carbon atoms is more preferable, and a methylene group is most preferable. Each of $Ra'^{21}$ independently represents an alkyl group, an alkoxy group, a halogen atom, a halogenated alkyl group, —COOR", —OC(=O)R", a hydroxyalkyl group, or a cyano group.

As the alkyl group in Ra'$^{21}$, an alkyl group of 1 to 5 carbon atoms is preferable.

As the alkoxy group in Ra'$^{21}$, an alkoxy group of 1 to 6 carbon atoms is preferable.

The alkoxy group is preferably a linear or branched type. Specifically, a group in which an alkyl group exemplified as the alkyl group in the Ra'$^{21}$ and an oxygen atom (—O—) are linked is exemplified.

Examples of the halogen atom in Ra'$^{21}$ include a fluorine atom, a chlorine atom, a bromine atom, and an iodine atom, and the fluorine atom is preferable.

The halogenated alkyl group in Ra'$^{21}$ is a group in which a part or all of the hydrogen atoms of alkyl group in Ra'$^{21}$ are substituted with the halogen atoms. As the halogenated alkyl group, a fluorinated alkyl group is preferable, and in particular, a perfluoroalkyl group is preferable.

In —COOR" and —OC(=O)R" in Ra'$^{21}$, both of R" are a hydrogen atom or an alkyl group.

In the present invention, among the above-described groups, a group represented by (lc-r-1) or (lc-r-2) is preferable.

Specific examples of groups represented by the following general formulas (ic-r-1) to (lc-r-7) are shown.

[Chemical formula 8]

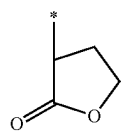
(r-lc-1-1)

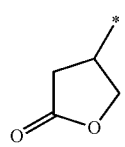
(r-lc-1-2)

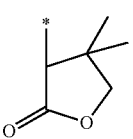
(r-lc-1-3)

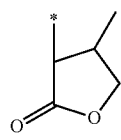
(r-lc-1-4)

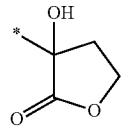
(r-lc-1-5)

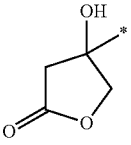
(r-lc-1-6)

-continued

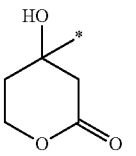
(r-lc-1-7)

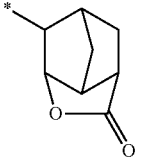
(r-lc-2-1)

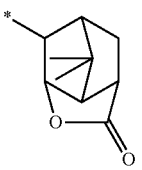
(r-lc-2-2)

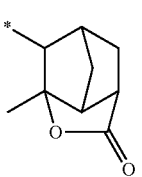
(r-lc-2-3)

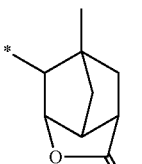
(r-lc-2-4)

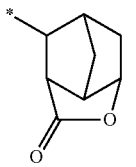
(r-lc-2-5)

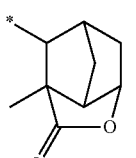
(r-lc-2-6)

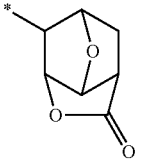
(r-lc-2-7)

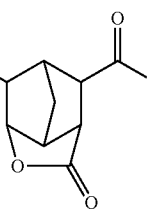
(r-lc-2-8)

(r-lc-2-9)
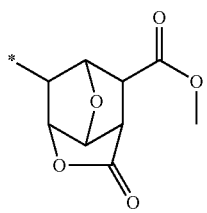
(r-lc-2-10)
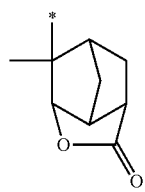
(r-lc-2-11)
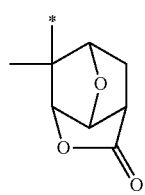
(r-lc-2-12)
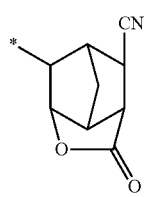
(r-lc-2-13)
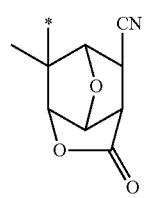
(r-lc-3-1)
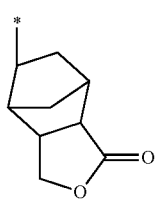
(r-lc-3-2)
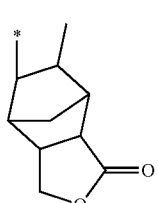
(r-lc-3-3)
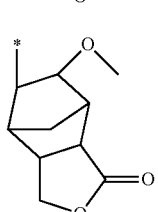
(r-lc-3-4)
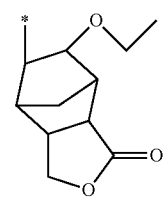
(r-lc-3-5)
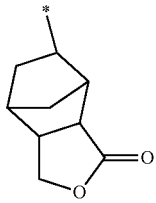
(r-lc-4-1)
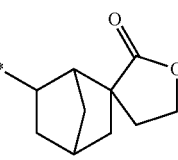
(r-lc-4-2)
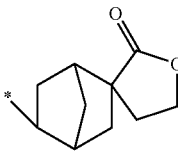
(r-lc-4-3)
(r-lc-4-4)
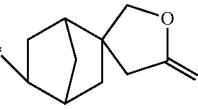
(r-lc-4-5)
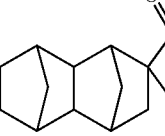
(r-lc-4-6)
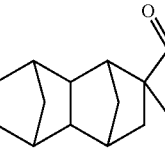
(r-lc-4-7)
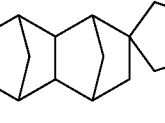
(r-lc-4-8)
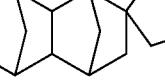

(r-lc-4-9)
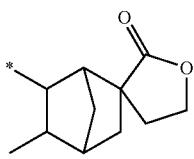

(r-lc-5-1)
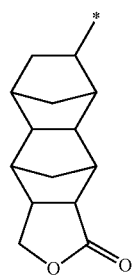

(r-lc-5-2)
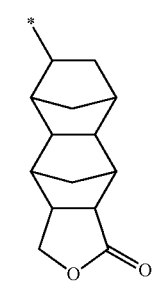

(r-lc-5-3)
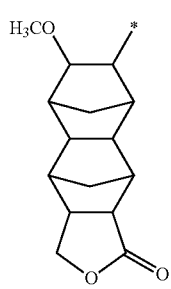

(r-lc-5-4)
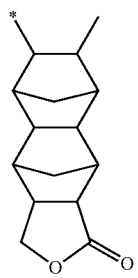

(r-lc-6-1)
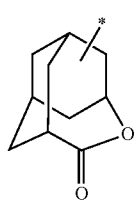

(r-lc-7-1)
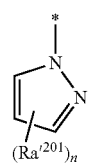

In the present invention, as the lactone-containing cyclic group, among the above-described groups, groups represented by (r-lc-1-1) to (r-lc-1-7), (r-lc-2-1) to (r-lc-2-13) are preferable, and groups represented by (r-lc-1-1) to (r-lc-1-7) are particularly preferable.

In addition, the substrate interacting group represented by the formula (ba0-3-1'-r1) or (ba0-3-1'-r2) is shown below.

[Chemical formula 9]

(ba0-3-1'-r1)
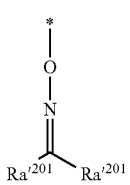

(ba0-3-1'-r2)

In the formulas, $Ra'^{21}$ represents a hydrogen atom, an alkyl group of 1 to 10 carbon atoms, and n is an integer of 1 to 3. In the formula (ba0-3-1'-r2), $Ra'^{201}$ is the same as the above, and in a case where $Ra'^{201}$ is an alkyl group, the alkyl groups may be bonded to each other to form a ring. In the formula, "*" represents a bond.

In the general formula (ba0-3-1'-r1) or (ba0-3-1'-r2), $Ra'^{201}$ represents a hydrogen atom, an alkyl group of 1 to 10 carbon atoms, and n is an integer of 1 to 3. Examples of the alkyl group of 1 to 10 carbon atoms in $Ra'^{201}$ include a methyl group, an ethyl group, an n-propyl group, an i-propyl group, 2-methylpropyl group, an 1-methylpropyl group, and a t-butyl group.

In the general formula (ba0-3-1'-r2), $Ra'^{201}$ is the same as the above, and in a case where $Ra'^{201}$ is an alkyl group, the alkyl groups may be bonded to each other to form a ring. Examples of the ring structure formed include a cyclopentyl group and a cyclohexyl group.

In addition, the "ether-containing cyclic group" as the substrate interacting group refers to a cyclic group containing a structure (cyclic ether) in which a carbon atom of the cyclic hydrocarbon is substituted with an oxygen. Specifically, the ether-containing cyclic groups represented by the following formulas (e-1) and (e-2) are preferable.

[Chemical formula 10]

(e-1)
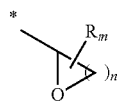

(e-2)

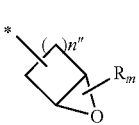

In the formulas, $R_m$ represents a hydrogen atom or an alkyl group of 1 to 5 carbon atoms, n is an integer of 1 to 5, and n" is an integer of 0 to 2.

In addition, in a case where the above-described substrate interacting group is an ether-containing cyclic group or a cyclooctatrienyl group, in addition to the substrate interaction, a crosslinking reaction also is likely to proceed, and therefore, it is considered that the undercoat agent layer is likely to be thickened.

As the structural unit (ba0-3), the structural unit represented by the following general formulas (ba0-3-1) to (ba0-3-4) is preferable.

[Chemical formula 11]

(ba0-3-1)

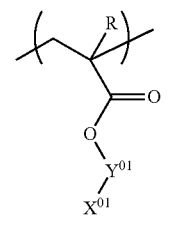

(ba0-3-2)

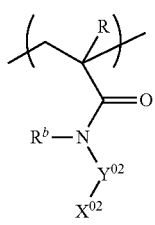

(ba0-3-3)

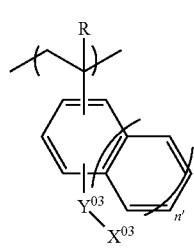

(ba0-3-4)

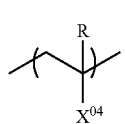

In the formulas, R is the same as the above, $R^b$ represents a hydrogen atom or an alkyl group of 1 to 5 carbon atoms, $Y^{01}$ represents a divalent linking group, $Y^{02}$ represents a divalent linking group, $Y^{03}$ represents a single bond or a divalent linking group, and $X^{01}$ to $X^{04}$ are the above-described substrate interacting groups.

In the above formula, as the divalent linking group of $Y^{01}$, which is not particularly limited, a divalent hydrocarbon group which may have a substituent and does not have an aromatic ring; and a divalent linking group which includes a hetero atom and does not have an aromatic ring are appropriately exemplified.

Divalent Hydrocarbon Group which May have a Substituent

The divalent hydrocarbon group as the linking group is preferably an aliphatic hydrocarbon group.

An aliphatic hydrocarbon group is a hydrocarbon group that has no aromaticity. The aliphatic hydrocarbon group may be saturated or unsaturated, and in general, is preferably saturated.

More specific examples of the aliphatic hydrocarbon group include a linear or branched aliphatic hydrocarbon group, and an aliphatic hydrocarbon group that includes a ring within the structure.

The linear or branched aliphatic hydrocarbon group preferably has 1 to 10 carbon atoms, more preferably 1 to 8 carbon atoms, and still more preferably 1 to 5 carbon atoms.

The linear aliphatic hydrocarbon group is preferably a linear alkylene group, and specific examples include a methylene group [—$CH_2$—], an ethylene group [—$(CH_2)_2$—], a trimethylene group [—$(CH_2)_3$—], a tetramethylene group [—$(CH_2)_4$—], and a pentamethylene group [—$(CH_2)_5$—].

The branched aliphatic hydrocarbon group is preferably a branched alkylene group, and specific examples include alkyl alkylene groups including alkyl methylene groups such as —$CH(CH_3)$—, —$CH(CH_2CH_3)$—, —$C(CH_3)_2$—, —$C(CH_3)(CH_2CH_3)$—, —$C(CH_3)(CH_2CH_2CH_3)$—, and —$C(CH_2CH_3)_2$—; alkyl ethylene groups such as —$CH(CH_3)CH_2$—, —$CH(CH_3)CH(CH_3)$—, —$C(CH_3)_2CH_2$—, —$CH(CH_2CH_3)CH_2$—, and —$C(CH_2CH_3)_2$—$CH_2$—; alkyl trimethylene groups such as —$CH(CH_3)CH_2CH_2$— and —$CH_2CH(CH_3)CH_2$—; and alkyl tetramethylene groups such as —$CH(CH_3)CH_2CH_2CH_2$— and —$CH_2CH(CH_3)CH_2CH_2$—. The alkyl group within the alkyl alkylene group is preferably a linear alkyl group of 1 to 5 carbon atoms.

The linear or branched aliphatic hydrocarbon group may have or may not have a substituent (a group or an atom other than a hydrogen atom) which substitutes a hydrogen atom. Examples of the substituent include a fluorine atom, a fluorinated alkyl group of 1 to 5 carbon atoms substituted with a fluorine atom, and an oxo group (=O).

Examples of the aliphatic hydrocarbon group that includes a ring within the structure include cyclic aliphatic hydrocarbon groups (groups in which two hydrogen atoms are removed from an aliphatic hydrocarbon ring) which may include a substituent including a hetero atom in the ring structure, groups in which the cyclic aliphatic hydrocarbon group is bonded to the terminal of a linear or branched aliphatic hydrocarbon group, and groups in which the cyclic aliphatic hydrocarbon group is interposed in a linear or branched aliphatic hydrocarbon group. Examples of the linear or branched aliphatic hydrocarbon group include the same groups as those described above.

The cyclic aliphatic hydrocarbon group preferably has 3 to 20 carbon atoms, and more preferably 3 to 12 carbon atoms.

The cyclic aliphatic hydrocarbon group may be a polycyclic group or a monocyclic group. The monocyclic aliphatic hydrocarbon group is preferably a group in which two hydrogen atoms are removed from a monocycloalkane. The monocycloalkane preferably has 3 to 6 carbon atoms, and specific examples include cyclopentane and cyclohexane. The polycyclic aliphatic hydrocarbon group is preferably a group in which two hydrogen atoms are removed from a polycycloalkane, and the polycycloalkane preferably has 7 to 12 carbon atoms. Specific examples of the polycycloalkane include adamantane, norbornane, isobornane, tricyclodecane, and tetracyclododecane.

The cyclic aliphatic hydrocarbon group may have or may not have a substituent (a group or an atom other than a hydrogen atom) which substitutes a hydrogen atom. Examples of the substituent include an alkyl group, an alkoxy group, a halogen atom, a halogenated alkyl group, a hydroxyl group, and an oxo group (=O).

As the alkyl group as the substituent, an alkyl group of 1 to 5 carbon atoms is preferable, and a methyl group, an ethyl group, a propyl group, an n-butyl group, and a tert-butyl group are most preferable.

As the alkoxy group as the substituent, an alkoxy group of 1 to 5 carbon atoms is preferable, and a methoxy group, an ethoxy group, an n-propoxy group, an iso-propoxy group, an n-butoxy group, and a t-butoxy group are more preferable, and a methoxy group and an ethoxy group are most preferable.

Examples of the halogen atom as the substituent include a fluorine atom, a chlorine atom, a bromine atom, and an iodine atom, and the fluorine atom is preferable.

As the halogenated alkyl group as the substituent, a group in which a part or all of the hydrogen atoms of the alkyl group are substituted with the halogen atoms is exemplified.

A part of the carbon atoms that constitute the ring structure of the cyclic aliphatic hydrocarbon group may be substituted with a substituent which includes a hetero atom. As the substituent including the hetero atom, —O—, —C(=O)—O—, —S—, —S(=O)$_2$—, and —S(=O)$_2$—O— are preferable.

Divalent Linking Group Including Hetero Atom

The hetero atom in the "divalent linking group including a hetero atom" of $Y^0$ described above refers to atoms other than a carbon atom and a hydrogen atom, and an oxygen atom, a nitrogen atom, a sulfur atom, and a halogen atom are exemplified.

Examples of the divalent linking group including a hetero atom include —O—, —C(=O)—O—, —C(=O)—, —O—C(=O)—O—, —C(=O)—NH—, —NH— (H may be substituted with a substituent such as an alkyl group and an acyl group), —S—, —S(=O)$_2$—, —S(=O)$_2$—O—, —NH—C(=O)—, =N—, a group represented by the general formula —$Y^{21}$—O—$Y^{22}$—, —[$Y^{21}$—C(=O)—O]$_{m'}$—$Y^{22}$—, —C(=O)—O—$Y^{22}$—, and —$Y^{21}$—O—C(=O)—$Y^{22}$— [in the formula, each of $Y^{21}$ and $Y^{22}$ independently represents a divalent hydrocarbon group which may have a substituent, O represents an oxygen atom, and m' is an integer of 0 to 3.].

In a case where $Y^0$ is —NH—, the H may be substituted with a substituent such as an alkyl group and an acyl group. The substituent (alkyl group, an aryl group, or the like) preferably has 1 to 10 carbon atoms, more preferably has 1 to 8 carbon atoms, and particularly preferably has 1 to 5 carbon atoms.

Each of $Y^{21}$ and $Y^{22}$ is independently a divalent hydrocarbon group which may have a substituent. As the divalent hydrocarbon group, the same groups exemplified as the "divalent hydrocarbon group which may have a substituent" in the above $Y^0$ are exemplified.

As $Y^{21}$, a linear aliphatic hydrocarbon group is preferable, a linear alkylene group is more preferable, a linear alkylene group of 1 to 5 carbon atoms is still more preferable, and a methylene group or an ethylene group is particularly preferable.

As $Y^{22}$, a linear or branched aliphatic hydrocarbon group is preferable, and a methylene group, an ethylene group, or an alkyl methylene group is more preferable. As the alkyl group in the alkyl methylene group, a linear alkyl group of 1 to 5 carbon atoms is preferable, a linear alkyl group of 1 to 3 carbon atoms is more preferable, and a methyl group is most preferable.

In the group represented by the formula —[$Y^{21}$—C(=O)—O]$_{m'}$—$Y^{22}$—, m' is an integer of 0 to 3, preferably an integer of 0 to 2, more preferably an integer of 0 or 1, and particularly preferably an integer of 1. That is, as the group represented by the formula —[$Y^{21}$—C(=O)—O]$_{m'}$—$Y^{22}$—, the group represented by the formula —$Y^{21}$—C(=O)—O—$Y^{22}$— is particularly preferable. Among these, the group represented by the formula —(CH$_2$)$_{a'}$—C(=O)—O—(CH$_2$)$_{b'}$— is preferable. In the formula, a' is an integer of 1 to 10, preferably an integer of 1 to 8, more preferably an integer of 1 to 5, still more preferably an integer of 1 or 2, and particularly preferably an integer of 1. b' is an integer of 1 to 10, preferably an integer of 1 to 8, more preferably an integer of 1 to 5, still more preferably an integer of 1 or 2, and particularly preferably an integer of 1.

As the divalent linking group including a hetero atom, a linear group having an oxygen atom as the hetero atom, for example, a group including an ether bond or an ester bond is preferable, a group represented the formulas —$Y^{21}$—O—$Y^{22}$—, —[$Y^{21}$—C(=O)—O]$_{m'}$—$Y^{22}$—, or —$Y^{21}$—O—C(=O)—$Y^{22}$— is more preferable.

Among the above, as the divalent linking group of $Y^{01}$, in particular, a linear or branched alkylene group, a divalent alicyclic hydrocarbon group, or a divalent linking group including a hetero atom is preferable. Among these, a linear, branched, or cyclic alkylene group, or a divalent linking group including an ester bond (—C(=O)—O—), —S(=O)$_2$ bond), an ether bond is preferable.

In the formula, $X^{01}$ is preferably a carboxy group, a hydroxyl group, a cyano group, an amino group, a trialkoxysilyl group, an azido group, a lactone-containing cyclic group, a group represented by the following formulas (ba0-3-1'-r1) to (ba0-3-1'-r2), and an ether-containing cyclic group. The alkoxy group in the trialkoxysilyl group is the same as the above, and as the trialkoxysilyl group, a trimethoxysilyl group is preferable.

In a case where $X^{01}$ is the group represented by the above-described formulas (ba0-3-1'-r1) to (ba0-3-1'-r2), the structural unit (ba0-3-1) is preferably a structural unit represented by the following formula (ba0-3-1').

[Chemical formula 12]

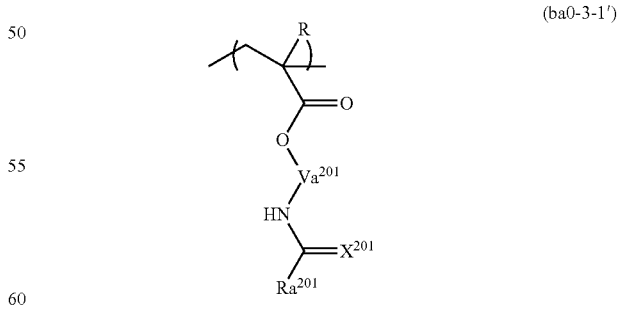

(ba0-3-1')

In the formula (ba0-3-1'), R represents a hydrogen atom, an alkyl group of 1 to 5 carbon atoms, or a halogenated alkyl group of 1 to 5 carbon atoms. $Va^{201}$ is a divalent linking group, $X^{201}$ is an oxygen atom or a sulfur atom, $Ra^{201}$ is the group represented by any one of the above-described formula (ba0-3-1'-r1) or (ba0-3-1'-r2).

In the formula (ba0-3-1'), R represents a hydrogen atom, an alkyl group of 1 to 5 carbon atoms, or a halogenated alkyl group of 1 to 5 carbon atoms, and is the same as the above.

In the formula (ba0-3-1'), $Va^{201}$ is a divalent linking group.

As the divalent linking group of $Va^{201}$, which is the same as the divalent linking group of $Y^{01}$, an ester bond [—C(=O)—O—], an ether bond (—O—), a linear or branched alkylene group, or a combination thereof is preferable, and, a linear alkylene group is particularly preferable. In a case where $Va^{201}$ is the linear alkylene group, the number of carbon atoms is preferably 1 to 10, and more preferably 1 to 6.

In the formula (ba0-3-1'), $X^{201}$ is an oxygen atom or a sulfur atom, $Ra^{201}$ is the group represented by any one of the formula (ba0-3-1-r1') or (ba0-3-1-r2').

In the formula (ba0-3-2), $Y^{02}$ is a divalent linking group, and is the same as the divalent linking group of $Y^{01}$ described above.

As $X^{02}$, a carboxy group, a hydroxyl group, a cyano group, an amino group, a trialkoxysilyl group, an azido group, and a lactone-containing cyclic group are preferable. The trialkoxysilyl group of $X^{02}$ is the same as the trialkoxysilyl group of $X^{01}$ described above.

In the formula (ba0-3-3), $Y^{03}$ is a single bond or a divalent linking group, and in a case where $Y^{03}$ is a divalent linking group, the divalent linking group is the same as the divalent linking group of $Y^{01}$ described above.

As $X^{03}$, a carboxy group, a hydroxyl group, a cyano group, an azido group, an amino group, a trialkoxysilyl group, and an ether-containing cyclic group are preferable.

In the formula (ba0-3-4), as $X^{04}$, a carboxy group and a cyclooctatrienyl group are preferable.

Hereinafter, specific examples of the structural unit (ba0-3) are shown. In the formula, R is the same as the above, and $R^1$ has also the same definition as R.

[Chemical formula 13]

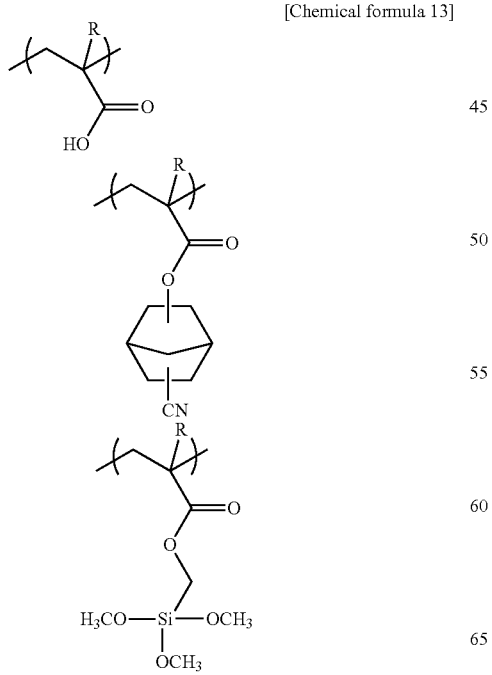

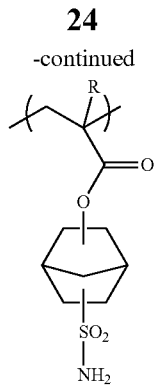

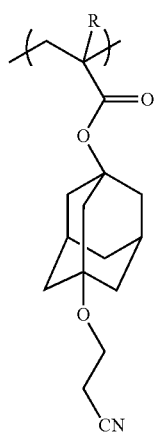

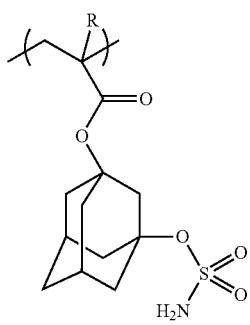

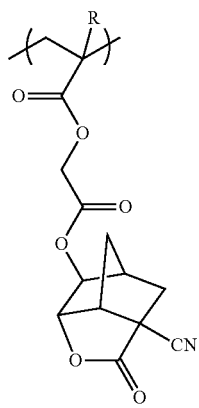

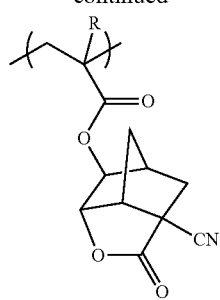
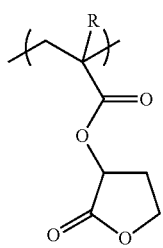
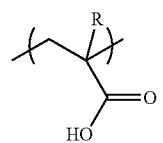
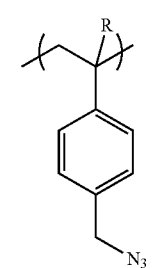
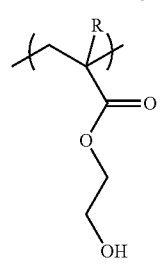
[Chemical formula 14]
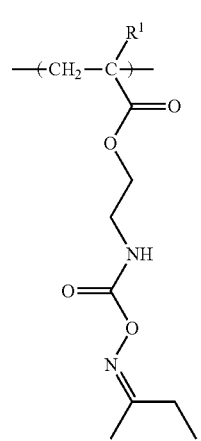
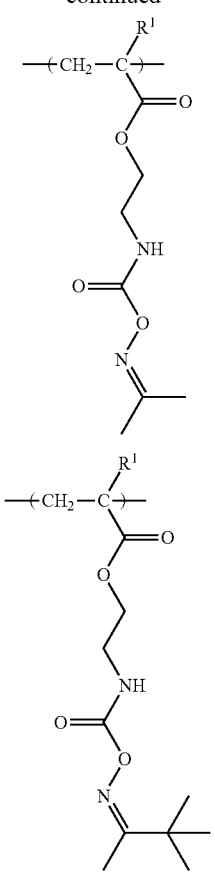
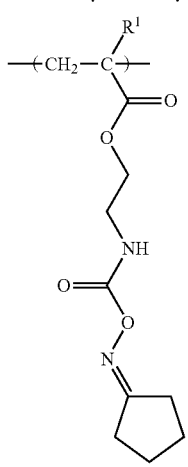
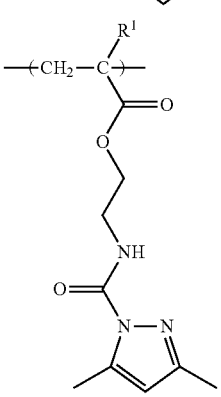

-continued

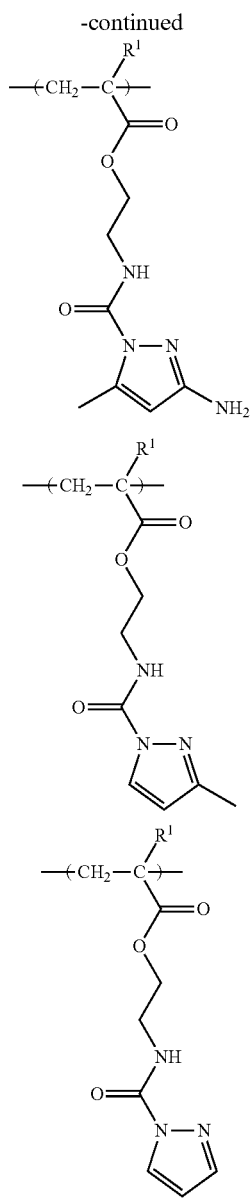

[Chemical formula 15]

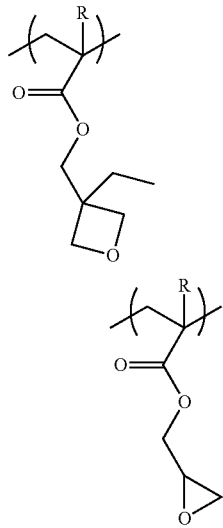

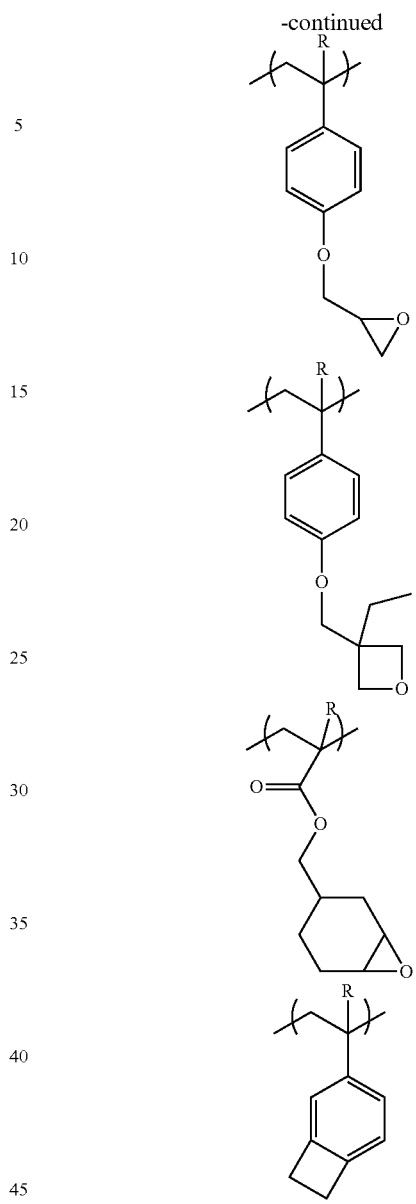

The structural unit (ba0-3) may be used alone or two or more kinds may be used in combination.

In the present invention, the structural unit (ba0-3) is preferably less than or equal to 20 mol %, more preferably 1 mol % to 10 mol %, and particularly preferably 1 mol % to 5 mol % among the structural units of the entire resin component (A).

In the present invention, when the blending amount of the structural unit (ba0-3) is set to the above-described upper limit value or less, it is possible to improve substrate adhesiveness.

In the present invention, the resin component (A) is preferably a copolymer having the structural units (ba0-1) and (ba0-3), a copolymer having the structural units (ba0-2) and (ba0-3), or a copolymer having the structural units (ba0-1), (ba0-2), and (ba0-3).

The mass average molecular weight (Mw) (the polystyrene equivalent value determined by gel permeation chromatography (GPC)) of the component (A) is not particularly limited, and is preferably 1,000 to 200,000, more preferably 1,500 to 200,000, and most preferably 2,000 to 150,000. When the mass average molecular weight of the component (A) is less than or equal to the upper limit value of this range, the component (A) is sufficiently dissolved in an organic solvent as described below, and therefore, coating properties to the substrate are excellent, and when the mass average molecular weight of the component (A) is greater than or equal to the lower limit value of this range, a composition having excellent production stability of the polymer and excellent coating properties to the substrate is obtained.

The dispersity index (Mw/Mn), which is not particularly limited, is preferably 1.0 to 5.0, more preferably 1.0 to 3.0, and most preferably 1.0 to 2.5. Moreover, Mn represents the number-average molecular weight.

For example, the component (A) can be obtained by polymerizing the monomers that give rise to each of the structural units by a known radical polymerization or the like using a radical polymerization initiator such as azobisisobutyronitrile (AIBN).

In addition, by using in combination of a chain transfer agent such as HS—$CH_2$—$CH_2$—$CH_2$—$C(CF_3)_2$—OH during the above polymerization, a —$C(CF_3)_2$—OH group may be introduced to the terminal of the component (A).

As the monomer that gives rise to each of the structural units, commercially available products may be used, and products synthesized by known methods in the related art may also be used.

In the undercoat agent of the present invention, the component (A) may be used alone or two or more kinds may be used in combination.

In the undercoat agent of the present invention, the content of the component (A) may be appropriately adjusted in accordance with a desired film thickness of a layer formed of an undercoat agent.

Organic Solvent; Component (S)

The undercoat agent of the present invention can be produced by dissolving materials in an organic solvent (hereinafter, also referred to as "component (S)").

The component (S) may be a solvent that can dissolve each of the components to be used to form a homogeneous solution, and any one or more types of those known in the art as a solvent of the film composition having a resin as a main component can be appropriately selected and used as the component(s).

Examples of the organic solvent include lactones such as γ-butyrolactone; ketones such as acetone, methyl ethyl ketone, cyclohexanone, methyl-n-pentyl ketone, methyl isopentyl ketone, and 2-heptanone; polyhydric alcohols such as ethylene glycol, diethylene glycol, propylene glycol, and dipropylene glycol; polyhydric alcohol derivatives including compounds having an ester bond, such as ethylene glycol monoacetate, diethylene glycol monoacetate, propylene glycol monoacetate and dipropylene glycol monoacetate, and polyhydric alcohol derivatives such as compounds having an ether bond, such as a monoalkyl ether (such as a monomethyl ether, monoethyl ether, monopropyl ether or monobutyl ether) or a monophenyl ether of any of the above polyhydric alcohols or compounds having an ester bond [among these, propylene glycol monomethyl ether acetate (PGMEA) and propylene glycol monomethyl ether (PGME) are preferred]; cyclic ethers such as dioxane; esters such as methyl lactate, ethyl lactate (EL), methyl acetate, ethyl acetate, butyl acetate, methyl pyruvate, ethyl pyruvate, methyl methoxypropionate, and ethyl ethoxypropionate; and aromatic organic solvents such as anisole, ethyl benzyl ether, cresyl methyl ether, diphenyl ether, dibenzyl ether, phenetole, butyl phenyl ether, ethylbenzene, diethylbenzene, pentylbenzene, isopropylbenzene, toluene, xylene, cymene, and mesitylene.

These organic solvents may be used individually, or as a mixed solvent containing two or more solvents.

Among these, propylene glycol monomethyl ether acetate (PGMEA), propylene glycol monomethyl ether (PGME), cyclohexanone, and EL are preferable.

In addition, a mixed solvent obtained by mixing PGMEA with a polar solvent is also preferable. The mixing ratio (mass ratio) of the mixed solvent can be appropriately determined in consideration of the compatibility of the PGMEA and the polar solvent, and is preferably within a range from 1:9 to 9:1, and more preferably from 2:8 to 8:2. For example, when EL is mixed as the polar solvent, the PGMEA:EL mass ratio is preferably 1:9 to 9:1, and more preferably 2:8 to 8:2. In addition, when PGME is mixed as the polar solvent, the PGMEA:PGME mass ratio is preferably 1:9 to 9:1, more preferably 2:8 to 8:2, and still more preferably 3:7 to 7:3. Alternatively, when PGME and cyclohexanone are mixed as polar solvents, the PGMEA:(PGME+cyclohexanone) mass ratio is preferably 1:9 to 9:1, more preferably 2:8 to 8:2, and still more preferably 3:7 to 7:3.

In addition, as the component (S), a mixed solvent of PGMEA, EL, or the above-described mixed solvent of PGMEA and a polar solvent, with γ-butyrolactone is also preferable. In this case, the mixing ratio (former:latter) of the mixed solvent is preferably 70:30 to 95:5.

The amount of the component (S) to be used, which is not particularly limited, is appropriately set in accordance with a coating film thickness such that a concentration that can be coated on a substrate or the like is obtained. In general, the component (S) is used such that the solid content concentration of the undercoat agent is within a range of 1 mass % to 20 mass %, and preferably a range of 2 mass % to 15 mass %.

The undercoat agent of the present invention is an undercoat agent used for phase separating a layer containing a block copolymer having a block of a structural unit derived from an (α-substituted) acrylate ester.

In the present invention, the block copolymer having a block of a structural unit derived from an (α-substituted) acrylate ester is preferably a block copolymer in which a plurality of types of blocks (partial structural components in which structural units of the same type are bonded repeatedly together) are bonded together. The number of types of blocks that constitute the block copolymer may be either 2 types, or 3 or more types.

In the present aspect, although the plurality of types of blocks that constitute the block copolymer are not particularly limited, provided they represent a combination capable of undergoing phase separation, it is preferable to use a combination of blocks which are mutually incompatible. Further, it is preferable to use a combination in which a phase formed of at least one type of block among the plurality of types of blocks that constitute the block copolymer can be selectively removed more easily than the phase(s) formed of the other type(s) of block(s).

In the present invention, the "period of the block copolymer" refers to the period of the phase structure observed when the phase-separated structure has been formed, and represents the sum of the length of each of the mutually incompatible phases. The period of the block copolymer corresponds with the length of one molecule of the block copolymer.

The period of the block copolymer is determined by the intrinsic polymer characteristics such as the polymerization degree N and the Flory-Huggins interaction parameter $\chi$. In other words, as the value of "$\chi N$" increases, the mutual repulsion between different blocks in the block copolymer increases. As a result, when $\chi N>10$ (hereafter, referred to as the "strong separation limit"), the repulsion between the different types of blocks in the block copolymer is large, and the tendency for phase separation to occur strengthens. At the strong separation limit, the period of the block copolymer is approximately $N^{2/3}\chi^{1/6}$. In other words, the period of the block copolymer is proportional to the polymerization degree N, which correlates with the molecular weight Mn and the molecular weight ratio between the different blocks. Accordingly, by adjusting the composition and the total molecular weight of the block copolymer used, the period of the block copolymer can be easily adjusted. Further, it is thought that for producing a finer phase-separated structure, it is advantageous to select a block copolymer having a low polymerization degree N (namely, a copolymer of small size) and a large interaction parameter $\chi$.

In addition, in the undercoat agent of the present invention, in addition to a block copolymer having a block of a structural unit derived from an ($\alpha$-substituted) acrylate ester, another homopolymer may be mixed.

For example, in a case where a block copolymer is formed of a block copolymer having a block of a structural unit derived from an ($\alpha$-substituted) acrylate ester and a block copolymer having another block A, the homopolymer to be mixed is at least one of each homopolymer of a block copolymer having a block of a structural unit derived from an ($\alpha$-substituted) acrylate ester or a block copolymer having the block A.

It is considered that a phase separation pattern size is easily adjusted by mixing these. In addition, for example, as a resin component of the undercoat agent, a mixture obtained by mixing each homopolymer of a block copolymer (block polymer) having a block of a structural unit derived from an ($\alpha$-substituted) acrylate ester or a block copolymer (block polymer) having the block A may be used instead of a block copolymer having a block of a structural unit derived from an ($\alpha$-substituted) acrylate ester.

Structural Unit Derived from an ($\alpha$-Substituted) Acrylate Ester (Structural Unit (a1))

The term, ($\alpha$-substituted) acrylate ester refers to one or both of the acrylate ester and a compound in which the hydrogen atom bonded to the carbon atom on the $\alpha$-position of acrylate ester has been substituted with a substituent. Examples of the substituent include alkyl groups of 1 to 5 carbon atoms.

Specific examples of the ($\alpha$-substituted) acrylate ester include acrylate esters such as methyl acrylate, ethyl acrylate, propyl acrylate, n-butyl acrylate, t-butyl acrylate, cyclohexyl acrylate, octyl acrylate, nonyl acrylate, hydroxyethyl acrylate, hydroxypropyl acrylate, benzyl acrylate, anthracene acrylate, glycidyl acrylate, 3,4-epoxycyclohexylmethane acrylate, and propyltrimethoxysilane acrylate; and methacrylate esters such as methyl methacrylate, ethyl methacrylate, propyl methacrylate, n-butyl methacrylate, t-butyl methacrylate, cyclohexyl methacrylate, octyl methacrylate, nonyl methacrylate, hydroxyethyl methacrylate, hydroxypropyl methacrylate, benzyl methacrylate, anthracene methacrylate, glycidyl methacrylate, 3,4-epoxycyclohexylmethane methacrylate, and propyltrimethoxysilane methacrylate.

Among these, methyl acrylate, ethyl acrylate, t-butyl acrylate, methyl methacrylate, ethyl methacrylate, and t-butyl methacrylate are preferable.

In the block copolymer, the number of types of blocks of the structural unit (a1) may be one type or two or more types.

In the block copolymer, the proportion of the structural unit (a1), which is dependent on the molecular weight of other structural units described below, with respect to the total of all the structural units that constitute the block copolymer, is preferably 10 mol % to 99.9 mol %, more preferably 15 mol % to 99.5 mol %, and still more preferably 20 mol % to 99 mol %.

In particular, in a case where a structural unit other than the structure unit (a1) described below is the structure unit (a0), the proportion of the structure unit (a1) is preferably 50 mol % to 99.9 mol %, more preferably 60 mol % to 99.5 mol %, and still more preferably 70 mol % to 99 mol %. When the proportion is within the above range, by phase separation, morphology suitable for processing can be formed. Among these, when the proportion of the structural unit (a1) with respect to the total of all the structural units that constitute the block copolymer is preferably 90 mol % to 99.5 mol % and more preferably 91 mol % to 99 mol %, a lamellar phase-separated structure is easily obtained, and on the other hand, when the proportion is preferably 65 mol % to 90 mol %, more preferably 70 mol % to 88 mol %, and still more preferably 73 mol % to 88 mol %, a cylinder-shaped phase-separated structure is easily obtained.

In addition, in a case where a structural unit other than the structure unit (a1) described below is a structural unit derived from a styrene or derivative thereof, the proportion of the structure unit (a1) is preferably 10 mol % to 99.5 mol %, more preferably 15 mol % to 99 mol %, and still more preferably 20 mol % to 98 mol %. When the proportion is within the above range, by phase separation, morphology suitable for processing can be formed.

Among these, when the proportion of the structural unit (a1) with respect to the total of all the structural units that constitute the block copolymer is preferably 60 mol % to 80 mol % and more preferably 65 mol % to 75 mol %, a cylinder-shaped phase-separated structure is easily obtained by a structural unit derived from a styrene or derivative thereof, when the proportion with respect to the total of all the structural units that constitute the block copolymer is preferably 20 mol % to 40 mol % and more preferably 25 mol % to 35 mol %, a cylinder-shaped phase-separated structure is easily obtained by the structural unit (a1), and on the other hand, when the proportion is preferably 40 mol % to 60 mol % and more preferably 45 mol % to 55 mol %, a lamellar phase-separated structure is easily obtained.

Other Structural Units

The block copolymer in the present invention preferably has one or more types of blocks other than the block of the structural unit (a1).

Examples of the block other than the block of the structural unit (a1) include blocks of a polyhedral oligomeric silsesquioxane (POSS) structure-containing structural unit and a structural unit derived from a styrene or derivative thereof, blocks of a structural unit derived from an ($\alpha$-substituted) acrylic acid, blocks of a structural unit derived from a siloxane or derivative thereof, and blocks of a structural unit derived from an alkylene oxide.

Polyhedral Oligomeric Silsesquioxane (POSS) Structure-Containing Structural Unit In the present invention, a block copolymer having a block of a polyhedral oligomeric silsesquioxane (POSS)

structure-containing structural unit (hereafter also referred to as "the structural unit (a0)") is preferably used.

By including a block of the POSS structure-containing structural unit, the interaction parameter χ of the polymer can be increased, which facilitates phase separation. In addition, the polymerization degree N can be reduced, which facilitates miniaturization of the phase-separated structure.

Examples of preferred POSS structures include groups represented by the following general formula (a0-r-1).

[Chemical formula 16]

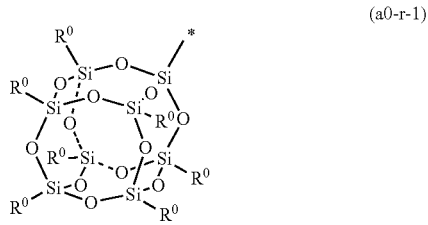

(a0-r-1)

In the formula, $R^0$ represents a monovalent hydrocarbon group which may have a substituent, wherein the plurality of $R^0$ groups may be the same as or different from each other. * represents a bond (this also applies below).

In formula (a0-r-1), the monovalent hydrocarbon group for $R^0$ preferably contains 1 to 20 carbon atoms, more preferably 1 to 10 carbon atoms, and still more preferably 1 to 8 carbon atoms. However, this number of carbon atoms does not include any carbon atoms within any of the substituents described below.

The monovalent hydrocarbon group for $R^0$ may be an aliphatic hydrocarbon group or an aromatic hydrocarbon group, but is preferably an aliphatic hydrocarbon group, and more preferably a monovalent aliphatic saturated hydrocarbon group (alkyl group).

More specific examples of this alkyl group include chain-like aliphatic hydrocarbon groups (linear or branched alkyl groups), and aliphatic hydrocarbon groups that include a ring within the structure.

The linear alkyl group preferably contains 1 to 8 carbon atoms, more preferably 1 to 5 carbon atoms, and still more preferably 1 to 3 carbon atoms. Specific examples include a methyl group, an ethyl group, an n-propyl group, an isopropyl group, an n-butyl group, an isobutyl group, and an n-pentyl group. Among these, a methyl group, an ethyl group or an n-propyl group is preferable, a methyl group, an ethyl group, or an isobutyl group is more preferable, an ethyl group or an isobutyl group is still more preferable, and an ethyl group is particularly preferable.

The branched alkyl group preferably contains 3 to 5 carbon atoms. Specific examples include an isopropyl group, an isobutyl group, a tert-butyl group, an isopentyl group, and a neopentyl group, and an isopropyl group or a tert-butyl group is the most desirable.

Examples of the aliphatic hydrocarbon group that includes a ring within the structure include cyclic aliphatic hydrocarbon groups (groups in which one hydrogen atom has been removed from an aliphatic hydrocarbon ring), groups in which such a cyclic aliphatic hydrocarbon group is bonded to the terminal of the above-described chain-like aliphatic hydrocarbon group, and groups in which a cyclic aliphatic hydrocarbon group is interposed within the chain of the above-described chain-like aliphatic hydrocarbon group.

The cyclic aliphatic hydrocarbon group preferably contains 3 to 8 carbon atoms, and more preferably 4 to 6 carbon atoms, and may be either a polycyclic group or a monocyclic group. The monocyclic group is preferably a group in which one or more hydrogen atoms have been removed from a monocycloalkane of 3 to 6 carbon atoms, and examples of the monocycloalkane include cyclopentane and cyclohexane. The polycyclic group is preferably a group in which one or more hydrogen atoms have been removed from a polycycloalkane of 7 to 12 carbon atoms, and specific examples of the polycycloalkane include adamantane, norbornane, isobornane, tricyclodecane, and tetracyclododecane.

The chain-like aliphatic hydrocarbon group may have a substituent. Examples of this substituent include a fluorine atom, a fluorinated alkyl group of 1 to 5 carbon atoms which is substituted with a fluorine atom, and an oxygen atom (=O).

The cyclic aliphatic hydrocarbon group may have a substituent. Examples of this substituent include an alkyl group of 1 to 5 carbon atoms, a fluorine atom, a fluorinated alkyl group of 1 to 5 carbon atoms, and an oxygen atom (=O).

When the monovalent hydrocarbon group for $R^0$ is an aromatic hydrocarbon group, the aromatic hydrocarbon group is a monovalent hydrocarbon group having at least one aromatic ring.

There are no particular limitations on this aromatic ring, provided it is a cyclic conjugated system having $4n+2\pi$ electrons, and the aromatic ring may be either monocyclic or polycyclic. The aromatic ring preferably contains 5 to 30 carbon atoms, more preferably 5 to 20 carbon atoms, still more preferably 6 to 15 carbon atoms, and particularly preferably 6 to 12 carbon atoms. However, this number of carbon atoms does not include any carbon atoms within any of the substituents described below.

Specific examples of the aromatic ring include aromatic hydrocarbon rings such as benzene, naphthalene, anthracene and phenanthrene, and aromatic heterocyclic rings in which a portion of the carbon atoms that constitute one of the above aromatic hydrocarbon rings has been substituted with a hetero atom. Examples of the hetero atom in the aromatic heterocyclic ring include an oxygen atom, a sulfur atom and a nitrogen atom. Specific examples of the aromatic heterocyclic ring include a pyridine ring and a thiophene ring.

Specific examples of the aromatic hydrocarbon group include groups in which one hydrogen atom has been removed from the above-described aromatic hydrocarbon ring or aromatic heterocyclic ring (namely, aryl groups or heteroaryl groups); groups in which one hydrogen atom has been removed from an aromatic compound having two or more aromatic rings (such as biphenyl or fluorene); and groups in which one of the hydrogen atoms of the above-described aromatic hydrocarbon ring or aromatic heterocyclic ring has been substituted with an alkylene group (for example, arylalkyl groups such as a benzyl group, phenethyl group, 1-naphthylmethyl group, 2-naphthylmethyl group, 1-naphthylethyl group or 2-naphthylethyl group).

The alkylene group bonded to the aryl group or heteroaryl group preferably contains 1 to 4 carbon atoms, more preferably 1 or 2 carbon atoms, and most preferably 1 carbon atom.

The aromatic hydrocarbon group may or may not have a substituent. Examples of the substituent include an alkyl group of 1 to 5 carbon atoms, a fluorine atom, a fluorinated alkyl group of 1 to 5 carbon atoms which is substituted with a fluorine atom, and an oxygen atom (=O).

Examples of the POSS structure-containing structural unit (the structural unit (a0)) include structural units containing a POSS structure and derived from an acrylate ester in which the hydrogen atom bonded to the carbon atom on the α-position may be substituted with a substituent, structural units containing a POSS structure and derived from an acrylamide, structural units containing a POSS structure and derived from a hydroxystyrene or hydroxystyrene derivative, and structural units containing a POSS structure and derived from a vinylbenzoic acid or vinylbenzoic acid derivative.

Among these, the structural unit (a0) is preferably a structural unit derived from an acrylate ester in which the hydrogen atom bonded to the carbon atom on the α-position may be substituted with a substituent.

Specific examples of preferred structural units (a0) include structural units represented by the following general formula (a0-1).

[Chemical formula 17]

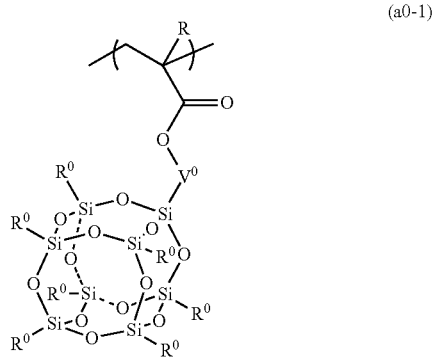

(a0-1)

In the formula, R represents a hydrogen atom, an alkyl group of 1 to 5 carbon atoms or a halogenated alkyl group of 1 to 5 carbon atoms, $V^0$ represents a divalent hydrocarbon group which may have a substituent. $R^0$ represents a monovalent hydrocarbon group which may have a substituent in which the plurality of $R^0$ groups may be the same as or different from each other.

In the formula (a0-1), the alkyl group of 1 to 5 carbon atoms for R is preferably a linear or branched alkyl group of 1 to 5 carbon atoms, and specific examples include a methyl group, an ethyl group, a propyl group, an isopropyl group, an n-butyl group, an isobutyl group, a tert-butyl group, a pentyl group, an isopentyl group, and a neopentyl group. The halogenated alkyl group of 1 to 5 carbon atoms is a group in which a part or all of the hydrogen atoms of the above-described alkyl group of 1 to 5 carbon atoms have each been substituted with a halogen atom. Examples of the halogen atom include a fluorine atom, chlorine atom, bromine atom and iodine atom, and a fluorine atom is particularly preferable.

R is preferably a hydrogen atom, an alkyl group of 1 to 5 carbon atoms, or a fluorinated alkyl group of 1 to 5 carbon atoms, and from the viewpoint of ease of industrial availability, is most preferably a hydrogen atom or a methyl group.

In the formula (a0-1), $R^0$ is the same as $R^0$ in the above-described formula (a0-r-1).

In the formula (a0-1), the divalent hydrocarbon group for $V^0$ may be an aliphatic hydrocarbon group or an aromatic hydrocarbon group. An aliphatic hydrocarbon group is a hydrocarbon group that has no aromaticity.

The aliphatic hydrocarbon group as the divalent hydrocarbon group for $V^0$ may be saturated or unsaturated, but in general, is preferably saturated.

More specific examples of the aliphatic hydrocarbon group include linear or branched aliphatic hydrocarbon groups, and aliphatic hydrocarbon groups that include a ring within the structure.

The linear or branched aliphatic hydrocarbon group preferably has 1 to 10 carbon atoms, more preferably 1 to 6 carbon atoms, still more preferably 1 to 4 carbon atoms, and most preferably 1 to 3 carbon atoms.

The linear aliphatic hydrocarbon group is preferably a linear alkylene group, and specific examples include a methylene group [—$CH_2$—], an ethylene group [—$(CH_2)_2$—], a trimethylene group [—$(CH_2)_3$—], a tetramethylene group [—$(CH_2)_4$—], and a pentamethylene group [—$(CH_2)_5$—].

The branched aliphatic hydrocarbon group is preferably a branched alkylene group, and specific examples include alkylalkylene groups, including alkylmethylene groups such as —$CH(CH_3)$—, —$CH(CH_2CH_3)$—, —$C(CH_3)_2$—, —$C(CH_3)(CH_2CH_3)$—, —$C(CH_3)(CH_2CH_2CH_3)$—, and —$C(CH_2CH_3)_2$—, alkylethylene groups such as —$CH(CH_3)CH_2$—, —$CH(CH_3)CH(CH_3)$—, —$C(CH_3)_2CH_2$—, —$CH(CH_2CH_3)CH_2$—, and —$C(CH_2CH_3)$—$CH_2$—, alkyltrimethylene groups such as —$CH(CH_3)CH_2CH_2$— and —$CH_2CH(CH_3)CH_2$—, and alkyltetramethylene groups such as —$CH(CH_3)CH_2CH_2CH_2$— and —$CH_2CH(CH_3)CH_2CH_2$—. The alkyl group within the alkylalkylene group is preferably a linear alkyl group of 1 to 5 carbon atoms.

Examples of the aliphatic hydrocarbon group that includes a ring within the structure include alicyclic hydrocarbon groups (groups in which two hydrogen atoms have been removed from an aliphatic hydrocarbon ring), groups in which an alicyclic hydrocarbon group is bonded to the terminal of a linear or branched aliphatic hydrocarbon group, and groups in which an alicyclic hydrocarbon group is interposed within the chain of a linear or branched aliphatic hydrocarbon group. Examples of the linear or branched aliphatic hydrocarbon group include the same groups as those described above.

The alicyclic hydrocarbon group contains preferably 3 to 20 carbon atoms, and more preferably 3 to 12 carbon atoms.

The alicyclic hydrocarbon group may be a polycyclic group or a monocyclic group. The monocyclic alicyclic hydrocarbon group is preferably a group in which two hydrogen atoms have been removed from a monocycloalkane. The monocycloalkane preferably contains 3 to 6 carbon atoms, and specific examples include cyclopentane and cyclohexane.

The polycyclic alicyclic hydrocarbon group is preferably a group in which two hydrogen atoms have been removed from a polycycloalkane, and the polycycloalkane preferably has 7 to 12 carbon atoms. Specific examples of the polycycloalkane include adamantane, norbornane, isobornane, tricyclodecane, and tetracyclododecane.

The aromatic hydrocarbon group is a hydrocarbon group having an aromatic ring.

There are no particular limitations on this aromatic ring, provided it is a cyclic conjugated system having $4n+2\pi$ electrons, and the aromatic ring may be either monocyclic or polycyclic. The aromatic ring contains preferably 5 to 30 carbon atoms, more preferably 5 to 20 carbon atoms, still more preferably 6 to 15 carbon atoms, and particularly preferably 6 to 12 carbon atoms. However, this number of carbon atoms does not include any carbon atoms within any of the substituents described below.

Specific examples of the aromatic ring include aromatic hydrocarbon rings such as benzene, naphthalene, anthracene, and phenanthrene, and aromatic heterocyclic rings in which a portion of the carbon atoms that constitute one of the above aromatic hydrocarbon rings has been substituted with a hetero atom. Examples of the hetero atom in the aromatic heterocyclic ring include an oxygen atom, a sulfur atom, and a nitrogen atom. Specific examples of the aromatic heterocyclic ring include a pyridine ring and a thiophene ring.

Specific examples of the aromatic hydrocarbon group include groups in which two hydrogen atoms have been removed from the aromatic hydrocarbon ring or an aromatic heterocyclic ring (namely, arylene groups or heteroarylene groups), groups in which two hydrogen atoms have been removed from an aromatic compound having two or more aromatic rings (such as biphenyl or fluorene), and groups in which one of the hydrogen atoms of a group in which one hydrogen atom is removed from the above-described aromatic hydrocarbon ring or aromatic heterocyclic ring (namely, an aryl group or heteroaryl group) has been substituted with an alkylene group (for example, groups in which a one more hydrogen atom has been removed from the aryl group of an arylalkyl group such as a benzyl group, a phenethyl group, a 1-naphthylmethyl group, a 2-naphthylmethyl group, a 1-naphthylethyl group, or 2-naphthylethyl group).

The alkylene group bonded to the aryl group or heteroaryl group contains preferably 1 to 4 carbon atoms, more preferably 1 or 2 carbon atoms, and particularly preferably 1 carbon atom.

Specific examples of the structural unit represented by the formula (a0-1) are shown below. In each of the following formulas, Ra represents a hydrogen atom, a methyl group, or a trifluoromethyl group.

[Chemical formula 18]

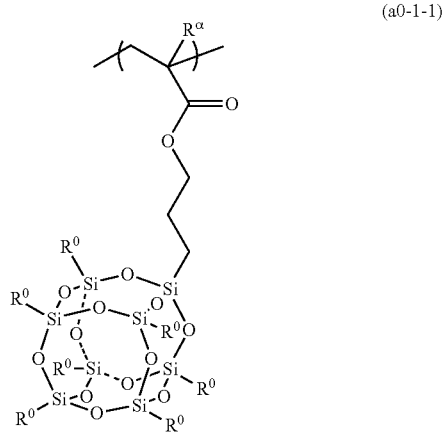

(a0-1-1)

$R^0$=an ethyl group or an isobutyl group

In the block copolymer, the number of types of blocks of the structural unit (a0) may be one type or two or more types.

In the block copolymer, the proportion of the structural unit (a0), which is dependent on the molecular weight of other structural units described below, with respect to the total of all the structural units that constitute the block copolymer, is preferably 0.1 mol % to 50 mol %, more preferably 0.5 mol % to 40 mol %, and still more preferably 1 mol % to 30 mol %. By ensuring that the proportion of the structural unit (a0) is greater than or equal to the preferred lower limit value, phase separation is able to occur more readily. On the other hand, by ensuring that the proportion is less than or equal to the preferred upper limit value, a good balance can be achieved with the other structural unit(s).

When the proportion of the structural unit (a0) with respect to the total of all the structural units that constitute the block copolymer is preferably 0.5 mol % to 10 mol % and more preferably 1 mol % to 9 mol %, a lamellar phase-separated structure is easily obtained, and on the other hand, when the proportion is preferably 10 mol % to 35 mol %, more preferably 12 mol % to 30 mol %, and still more preferably 12 mol % to 27 mol %, a cylinder-shaped phase-separated structure is easily obtained.

Examples of the styrene or derivative thereof include α-methylstyrene, 2-methylstyrene, 3-methylstyrene, 4-methylstyrene, 4-t-butylstyrene, 4-n-octylstyrene, 2,4,6-trimethylstyrene, 4-methoxystyrene, 4-t-butoxystyrene, 4-hydroxystyrene, 4-nitrostyrene, 3-nitrostyrene, 4-chlorostyrene, 4-fluorostyrene, 4-acetoxyvinylstyrene, 4-vinylbenzyl chloride, 1-vinylnaphthalene, 4-vinylbiphenyl, 1-vinyl-2-pyrrolidone, 9-vinylanthracene, and vinylpyridine.

The term "(α-substituted) acrylic acid" refers to one or both of acrylic acid and a compound in which the hydrogen atom bonded to the carbon atom on the α-position of acrylic acid has been substituted with a substituent. Examples of the substituent include alkyl groups of 1 to 5 carbon atoms.

Specific examples of the (α-substituted) acrylic acid include acrylic acid and methacrylic acid.

Examples of the siloxane or derivative thereof include dimethylsiloxane, diethylsiloxane, diphenylsiloxane, and methylphenylsiloxane.

Examples of the alkylene oxide include ethylene oxide, propylene oxide, isopropylene oxide, and butylene oxide.

Among the above, the block other than the block of the structural unit (a1) is preferably blocks of a polyhedral oligomeric silsesquioxane (POSS) structure-containing structural unit and a structural unit derived from a styrene or derivative thereof, and blocks of a structural unit derived from an (α-substituted) acrylic acid.

In the block copolymer, the proportion of the structural unit other than the structural units (a0) and (a1), with respect to the total of all the structural units that constitute the block copolymer, is preferably 10 mol % to 99.5 mol %, more preferably 15 mol % to 99 mol %, and still more preferably 20 mol % to 98 mol %.

When a structural unit derived from an (α-substituted) acrylic acid or an (α-substituted) acrylate ester is used as the structural unit other than the structural unit (a0), the proportion of the (α-substituted) acrylic acid or the (α-substituted) acrylate ester (or if the copolymer includes both, the proportion of the combination thereof), with respect to the total of all the structural units that constitute the block copolymer, is preferably 10 mol % to 99 mol %, more preferably 15 mol % to 99 mol %, and still more preferably 20 mol % to 98 mol %.

By ensuring that the proportion of the structural unit other than the structural unit (a0) satisfies the above range, a good balance can be achieved with the structural unit (a0).

The block copolymer used in the present invention has a block of the structural unit (a1), and is preferably a block copolymer having a block of the structural unit (a1) and a block of the structural unit (a0); a block copolymer having a block of the structural unit (a1) and a block of a structural unit derived from a styrene or derivative thereof; and a block copolymer having a block of the structural unit (a1) and a block of the structural unit derived from an (α-substituted) acrylic acid.

Specific examples of such block copolymers include block copolymers having a block of the structural unit (a0) and a block of methyl acrylate, block copolymers having a block of the structural unit (a0) and a block of ethyl acrylate, block copolymers having a block of the structural unit (a0) and a block of t-butyl acrylate, block copolymers having a block of the structural unit (a0) and a block of methyl methacrylate, block copolymers having a block of the structural unit (a0) and a block of ethyl methacrylate, block copolymers having a block of the structural unit (a0) and a block of t-butyl methacrylate, block copolymers having a block of the structural unit (a1) and a block of styrene, block copolymers having a block of methyl methacrylate and a block of styrene, block copolymers having a block of the structural unit (a1) and a block of acrylic acid, and block copolymers having a block of the structural unit (a1) and a block of methacrylic acid.

In the present aspect, the use of a block copolymer having a block of the structural unit (a0) and a block of methyl methacrylate or a block copolymer having a block of methyl methacrylate and a block of styrene is particularly preferred.

The mass average molecular weight (Mw) of the block copolymer (the polystyrene equivalent value determined by gel permeation chromatography) is not particularly limited provided that it enables phase separation to occur, and is preferably 1,000 to 150,000, more preferably 3,000 to 100,000, and still more preferably 5,000 to 80,000.

The dispersity index (Mw/Mn) of the block copolymer is preferably 1.0 to 3.0, more preferably 1.0 to 1.5, and still more preferably 1.0 to 1.2. Mn represents the number-average molecular weight.

The period of pattern size which can be formed by the block copolymer is preferably 5 nm to 120 nm, more preferably 5 nm to 100 nm, and still more preferably 10 nm to 80 nm.

Organic Solvent

The organic solvent used in the block copolymer solution may be any organic solvent capable of dissolving the block copolymer to form a uniform solution, and examples include lactones such as γ-butyrolactone; ketones such as acetone, methyl ethyl ketone, cyclohexanone, methyl-n-pentyl ketone, methyl isopentyl ketone, and 2-heptanone; polyhydric alcohols such as ethylene glycol, diethylene glycol, propylene glycol, and dipropylene glycol; polyhydric alcohol derivatives including compounds having an ester bond, such as ethylene glycol monoacetate, diethylene glycol monoacetate, propylene glycol monoacetate, and dipropylene glycol monoacetate, and compounds having an ether bond, such as a monoalkyl ether (such as a monomethyl ether, monoethyl ether, monopropyl ether, or monobutyl ether) or a monophenyl ether of any of the above polyhydric alcohols or compounds having an ester bond [among these polyhydric alcohol derivatives, propylene glycol monomethyl ether acetate (PGMEA) and propylene glycol monomethyl ether (PGME) are preferred]; cyclic ethers such as dioxane; esters such as methyl lactate, ethyl lactate (EL), methyl acetate, ethyl acetate, butyl acetate, methyl pyruvate, ethyl pyruvate, methyl methoxypropionate, and ethyl ethoxypropionate; and aromatic organic solvents such as anisole, ethyl benzyl ether, cresyl methyl ether, diphenyl ether, dibenzyl ether, phenetole, butyl phenyl ether, ethylbenzene, diethylbenzene, pentylbenzene, isopropylbenzene, toluene, xylene, cymene, and mesitylene.

These organic solvents may be used individually, or as a mixed solvent containing two or more solvents.

Among these, PGMEA, PGME, cyclohexanone, and EL are preferable.

In addition, a mixed solvent obtained by mixing PGMEA with a polar solvent is also preferable. The mixing ratio (mass ratio) of the mixed solvent can be appropriately determined, with due consideration of the compatibility of the PGMEA and the polar solvent, but is within a range preferably from 1:9 to 9:1, and more preferably from 2:8 to 8:2. For example, when EL is mixed as the polar solvent, the PGMEA:EL mass ratio is preferably 1:9 to 9:1, and more preferably 2:8 to 8:2. In addition, when PGME is mixed as the polar solvent, the PGMEA:PGME mass ratio is preferably 1:9 to 9:1, more preferably 2:8 to 8:2, and still more preferably 3:7 to 7:3. In addition, when PGME and cyclohexanone are mixed as polar solvents, the PGMEA:(PGME+cyclohexanone) mass ratio is preferably 1:9 to 9:1, more preferably 2:8 to 8:2, and still more preferably 3:7 to 7:3.

In addition, as the organic solvent for the block copolymer solution, a mixed solvent of PGMEA, EL, or the above-described mixed solvent of PGMEA and a polar solvent, with γ-butyrolactone is also preferable. In this case, the mixing ratio (mass ratio of the former and latter) of the mixed solvent is preferably 70:30 to 95:5.

If desired, other miscible additives besides the above-described block copolymer and organic solvent can also be added to the block copolymer solution. For example, appropriate amounts of additive resins for improving the performance of the pattern formed of the neutralization film described below, surfactants for improving the applicability to the support, dissolution inhibitors, plasticizers, stabilizers, colorants, halation prevention agents, dyes, sensitizers, base-generating agents, and basic compounds may be added as required.

Method of Producing Structure Containing Phase-Separated Structure

The second aspect of the present invention is a method of producing a structure containing a phase-separated structure, having a step of coating the undercoat agent of the first aspect of the present invention on a substrate to form a layer formed of the undercoat agent, a step of forming a layer containing a block copolymer having a block of a structural unit derived from an (α-substituted) acrylate ester on the layer formed of the undercoat agent, and a step of phase-separating the layer containing the block copolymer. Hereinafter, the method of producing a structure containing a phase-separated structure of the present invention will be specifically described with reference to FIG. 1. However, the present invention is not limited to the following description.

Step of Coating the Undercoat Agent on a Substrate to Form a Layer Formed of the Undercoat Agent In the method of producing a structure containing a phase-separated structure of the present invention, first, by coating the undercoat agent on a substrate, a layer formed of the undercoat agent is formed.

Substrate

There are no particular limitations on the type of a substrate 1, provided that the block copolymer-containing solution can be coated on the surface of the substrate. Examples of the substrate 1 include substrates formed from metals such as silicon, copper, chromium, iron, and aluminum, substrates formed from inorganic substances such as glass, titanium oxide, silica, and mica, and substrates formed from organic compounds such as acrylic sheets, polystyrene, cellulose, cellulose acetate, and phenolic resins.

In addition, there are no particular limitations on the size or shape of the substrate 1 used in the present invention. The substrate 1 needs not necessarily have a smooth surface, and substrates of various shapes formed of all manner of materials can be appropriately selected. For example, substrates having a curved surface, flat substrates having surface unevenness, and even thin flake-shaped substrates can be variously used.

In addition, an inorganic and/or organic film may be provided on the surface of the substrate 1. Examples of the inorganic film include inorganic antireflection films (inorganic BARC). Examples of the organic film include organic antireflection films (organic BARC).

The inorganic film, for example, can be formed by coating an inorganic antireflection film composition of a silicon-based material or the like on a substrate and performing baking or the like.

The organic film, for example, can be formed by coating an organic film-forming material in which a resin component and the like constituting the film are dissolved in an organic solvent on a substrate with a spinner or the like, and performing baking treatment under the heating conditions of preferably 200° C. to 300° C. for preferably 30 seconds to 300 seconds, and more preferably 60 seconds to 180 seconds. The organic film-forming material used at this time does not necessarily need to have the sensitivity with respect to light and electron beam, as the resist film, and the organic film-forming material may or may not have the sensitivity. Specifically, it is possible to use a resist or resin which is generally used in the production of semiconductor elements or liquid crystal display elements.

In addition, the organic film-forming material is preferably a material capable of forming an etchable, in particular, a dry etchable organic film such that an organic film pattern can be formed by etching the organic film using a pattern formed of the block copolymer, and transferring the pattern to the organic film. Among these, a material capable of forming an organic film to which an etching such as an oxygen plasma etching can be performed is preferable. Such an organic film forming material may be a material used for forming an organic film such as an organic BARC in the related art. Examples of the material include an ARC series manufactured by Brewer Science, Inc., an AR series manufactured by Rohm and Haas Company, and a SWK series manufactured by Tokyo Ohka Kogyo Co., Ltd.

Before a layer 2 formed of the undercoat agent of the first aspect of the present invention is formed on a substrate, the surface of the substrate 1 may be cleaned in advance. By cleaning the substrate surface, coating of the undercoat agent can be performed more satisfactorily.

Methods known in the related art can be used as the cleaning treatment, and examples include an oxygen plasma treatment, an ozone oxidation treatment, an acid alkali treatment, and a chemical modification treatment.

A method of coating the undercoat agent of the first aspect on the substrate 1 to form the layer 2 formed of the undercoat agent is not particularly limited, and for example, the layer 2 can be formed by methods known in the related art.

For example, by forming a coating film by coating an undercoat agent on the substrate 11 by a method known in the related art such as a spin coating, or a coating using a spinner and drying, the layer 2 formed of the undercoat agent can be formed.

The drying method of the coating film is not particularly limited, provided it can volatilize the organic solvent included in the undercoat agent, and a baking method and the like are exemplified.

The baking temperature is preferably 80° C. to 300° C., more preferably 100° C. to 270° C., and still more preferably 120° C. to 250° C. The baking time is preferably 30 seconds to 500 seconds, and more preferably 60 seconds to 240 seconds.

By providing the layer 2 formed of a undercoat agent on the surface of the substrate 1, the surface of the substrate 1 is neutralized, and it is possible to suppress only the phase formed of particular blocks in a layer 3 formed of a block copolymer provided on the upper layer to come into contact with the substrate surface. As a result, by phase separation of the layer 13 including a block copolymer, it is possible to form a cylindrical structure, a lamellar structure, a dot structure, a gyroid structure, and a sphere dispersion structure oriented freely with respect to the substrate surface.

After baking the undercoat agent layer, if necessary, a step of cleaning uncrosslinked portion (non-substrate interacting portion) or the like in the undercoat agent layer by rinsing with a rinsing liquid such as a solvent may be included. Since the uncrosslinked portion can be removed by the cleaning step, a phase separated structure formed of a lamellar structure or a cylindrical structure arranged in the vertical direction with respect to the substrate surface is easily formed. Moreover, the rinsing liquid is not limited, provided it can dissolve the uncrosslinked portion, and it is possible to use a solvent such as PGMEA, PGME, and EL or commercially available thinners. In addition, after the cleaning step, post-baking may be performed at about 80° C. to 150° C. to volatilize the rinsing liquid.

Step of Forming a Layer Containing a Block Copolymer Having a Block of a Structural Unit Derived from an (α-Substituted) Acrylate Ester on a Layer Formed of the Undercoat Agent A method of forming the layer 3 including a block copolymer having a block of a structural unit derived from an (α-substituted) acrylate ester on the layer 2 formed of the undercoat agent is not particularly limited, and for example, it can be formed by coating a composition containing a block copolymer on the layer 2 formed of the undercoat agent. As the method of coating, the same method as that of the undercoat agent can be exemplified.

In the present invention, the thickness of the layer 3 including a block copolymer may be any thickness sufficient to allow phase separation to occur, and the lower limit value of the thickness, which is not particularly limited, is preferably greater than or equal to 5 nm, and more preferably greater than or equal to 10 nm in consideration of a structure period size of a phase-separated structure to be formed, uniformity of a nanostructure, or the like.

Description of the block copolymer having a block of a structural unit derived from an (α-substituted) acrylate ester is the same as the above.

Step of Phase-Separating a Layer Containing a Block Copolymer

Phase separation of the layer 3 containing a block copolymer is performed by heat-treating the substrate 1 provided with a layer 2 formed of the undercoat agent, on which a layer 3 containing the block copolymer is formed, for forming a phase-separated structure in which at least a portion of the substrate surface is exposed by selectively removing the block copolymer in a subsequent step. The temperature of the heat treatment is preferably the glass transition temperature of the block copolymer being used or higher, and the heat treatment is preferably performed at a temperature lower than the thermal decomposition temperature. In general, the heat treatment is preferably performed at 180° C. to 270° C. for 30 seconds to 3600 seconds (60 minutes), and for example, even in a case where the block copolymer is POSS-PMMA (Mw: 40 k to 20 k), the range can be applied.

In addition, the heat treatment is preferably performed in a low-reactive gas such as nitrogen.

Optional Step

Top Coat Layer Forming Step

In the present invention, a top coat film is preferably formed by coating, on the layer containing the block copolymer, a top coat material which undergoes a change in polarity upon heating and controls the surface energy of the layer containing the block copolymer.

By using this top coat material to provide a top coat film on the layer containing the block copolymer, the surface state of the layer can be controlled favorably, and phase separation can be achieved in a more stable manner.

In the present embodiment, formation of the top coat film can be performed, for example, by using a spinner or the like to apply the above-described top coat material to the layer 2 containing the block copolymer. Following this coating, a baking treatment may be performed. In the baking treatment, the heating temperature is preferably 80° C. to 280° C., and the heating time is preferably 10 seconds to 600 seconds.

The thickness of the top coat film formed on the layer 2 is preferably 2 nm to 500 nm, more preferably 5 nm to 200 nm, and still more preferably 10 nm to 100 nm. By ensuring that the thickness of the top coat film satisfies the preferred range described above, any effects of the external environment can be adequately blocked, and enabling the phase separation to occur more readily.

As the top coat material, the following top coat materials can be used.

Step of Selectively Removing a Phase Formed of at Least One Type of Block Among the Plurality of Types of Block that Constitute the Block Copolymer in a Layer Containing the Block Copolymer A pattern may be formed by selectively removing a phase 3a formed of at least one type of block among the plurality of types of block that constitute the block copolymer in the layer 3 containing the block copolymer.

Moreover, in the following description, among the blocks that constitute the block copolymer, a block which is not selectively removed in a next step is referred to as a "$P_A$ block", and a block which is selectively removed is referred to as a "$P_B$ block". For example, after a layer containing PS-PMMA block copolymer is phase-separated, by performing an oxygen plasma treatment or a hydrogen plasma treatment with respect to the layer, a phase formed of PMMA is selectively removed. In this case, PS is a $P_A$ block, and PMMA is a $P_B$ block.

Next, in the layer containing the block copolymer on the substrate after forming a phase-separated structure, at least a portion of the block in the phase formed of the $P_B$ block is selectively removed (decomposition into low molecules). By selectively removing a portion of the $P_B$ block in advance, the solubility of the block within the developing solution can be enhanced, and as a result, the phase formed of the $P_B$ block is selectively removed more easily than the phase formed of the PA block.

Such a selective removal treatment is not particularly limited, provided the treatment is able to decompose and remove the $P_B$ block without affecting the PA block, and the method can be appropriately selected from methods used for removing a resin film in accordance with the types of the PA block and the PB block. In addition, in a case where a neutralization film is formed on the substrate surface in advance, the neutralization film is removed in the same manner as a phase formed of the $P_B$ block. Examples of the removal treatment include an oxygen plasma treatment, an ozone treatment, a UV irradiation treatment, a pyrolysis treatment, and a chemical decomposition treatment.

In addition, in a case of forming a top coat layer, the operation for selective removal of a phase 2a may be performed without removing the top coat film, but the invention is not limited to this particular method, and the selective removal operation may be performed after the top coat film is removed. Performing the operation for selective removal of the phase formed of the block after the top coat film is removed is preferable in terms of enabling more uniform removal of the top coat film to be done.

Removal of the top coat film can be appropriately performed in accordance with the types of the top coat material. Removal of the top coat film can be performed by a method of coating a solvent for the top coat material to the top coat film.

A substrate on which a pattern 3b is formed by phase separation of the layer 3 formed of a block copolymer in the above manner can be also used as it is, and by further performing a heat treatment, it is also possible to change the shape of the polymer nanostructures on the substrate. The temperature of the heat treatment is preferably the glass transition temperature of the block copolymer being used or higher, and the heat treatment is preferably performed at a temperature lower than the thermal decomposition temperature. In addition, the heat treatment may be performed in an atmosphere, and is preferably performed in a low-reactive gas such as nitrogen.

Guide Pattern Forming Step

In the pattern forming method of the present invention, after [Step of coating the undercoat agent on a substrate to form a layer formed of the undercoat agent], before [Step of forming a layer containing a block copolymer in which the plurality of types of polymer are bonded on a layer formed of the undercoat agent], a guide pattern in which a pattern is formed on the layer 2 formed of a undercoat agent may be provided in advance. Thus, arrangement structure control of a phase-separated structure is possible according to the shape and surface properties of the guide pattern. For example, even in a block copolymer which forms a random fingerprint shaped phase-separated structure in a case where the guide pattern is not present, by introducing a groove structure of a resist film on the substrate surface, the phase-separated structure oriented along the groove is obtained. A guide pattern may be introduced by such a principle. In addition, when the surface of the guide pattern has affinity with any polymer constituting the block copolymer, a phase separated structure formed of a lamellar structure or a cylindrical structure arranged in the vertical direction with respect to the substrate surface can be easily formed.

Specifically, for example, a resist composition is coated on the substrate surface with a spinner or the like, and pre-bake (post applied bake (PAB)) is performed under temperature conditions of 80° C. to 150° C. for 40 seconds to 120 seconds, preferably 60 seconds to 90 seconds. For example, after the resultant is selectively exposed with an ArF excimer laser beam through a desired mask pattern by an ArF exposure apparatus or the like, PEB (post exposure bake) is performed under temperature conditions of 80° C. to 150° C. for 40 seconds to 120 seconds, preferably 60 seconds to 90 seconds. Next, this is subjected to a developing treatment using an alkali developing solution, for example, 0.1% by mass to 10% by mass aqueous tetramethylammonium hydroxide (TMAH) solution, and preferably water rinse is performed with pure water and dried. Further, in some cases, a baking treatment (post bake) may be performed following the developing treatment. In this manner, it is possible to form a guide pattern faithful to the mask pattern.

In addition, in the formation of the guide pattern, the guide pattern may be formed by nanoimprint lithography. In the nanoimprint lithography, it is possible to form a guide pattern by pressing a mold in which a desired pattern is formed against a base on which a nanoimprint material such as a resin layer is formed on the surface, and peeling off the mold after curing the resin layer by heating or exposure, if necessary.

The height from the substrate surface (or the neutralization film surface) of the guide pattern is preferably greater than or equal to the thickness of the layer containing the block copolymer formed on the substrate surface. For example, the height from the substrate surface (or the neutralization film surface) of the guide pattern can be appropriately adjusted by the film thickness of the resist film formed by coating a resist composition used in forming the guide pattern.

As the resist composition used in forming the guide pattern, a composition having affinity with any polymer constituting the block copolymer can be appropriately selected from among resist compositions typically used in forming resist patterns and modified compositions thereof, and used. As the resist composition, a positive resist composition in which the exposed portions are dissolved and removed to form a positive pattern, or a negative resist composition in which the unexposed portions are dissolved and removed to form a negative pattern may be used, and the negative resist composition is preferable. As the negative resist composition, for example, a resist composition containing an acid generating agent and a base material component of which the solubility in a developing solution containing an organic solvent is reduced by the action of the acid, in which the base material component contains a resin component having a structural unit which is decomposed by the action of the acid and polarity thereof is increased is preferable.

In addition, after a solution of a block copolymer is supplied on a substrate surface on which a guide pattern is formed, to cause phase separation, a heat treatment is performed. Thus, as the resist composition for forming a guide pattern, a composition capable of forming a resist film having excellent solvent resistance and heat resistance is preferable.

In addition, examples of the nanoimprint material used in the guide pattern forming method by the nanoimprint include silicon-based compound-containing materials disclosed in JP-A-2007-072374, JP-A-2007-329276, and JP-A-2008-246876, and organic materials using an acrylic resin or the like instead of the silicon-based compounds.

Top Coat Material

Hereinafter, the top coat material preferably used in the method of producing a structure containing a phase-separated structure of the present invention will be described.

The top coat material in the present invention is a top coat material (hereafter, also referred to as "the top coat material (1)") containing a polymeric compound having a structural unit (Tc1) which undergoes a change in polarity upon heating, and a surface energy control agent which controls the surface energy of the layer containing the block copolymer.

In addition, the top coat material of the present invention may be a top coat material (hereafter, also referred to as "the top coat material (2)") containing a polymeric compound having a structural unit (Tc1) which undergoes a change in polarity upon heating and a structural unit (Tc2) which controls the surface energy of the layer containing the block copolymer.

Top Coat Material (1)

The top coat material (1) contains a polymeric compound having a structural unit (Tc1) which undergoes a change in polarity upon heating, and a surface energy control agent which controls the surface energy of the layer containing the block copolymer.

Polymeric Compound

The polymeric compound used in the top coat material (1) has a structural unit (Tc1) which undergoes a change in polarity upon heating.

By including the structural unit (Tc1), the surface energy of the layer containing the block copolymer can be maintained at an appropriate level during phase separation.

The expression "structural unit which undergoes a change in polarity upon heating" describes a repeating unit which undergoes a change in structure upon heating, and causing a change in the exposed state of a polar group.

Examples include a repeating unit in which an open ring structure undergoes a dehydration condensation upon heating to form a ring structure, and thus causing a change in the exposed state of a polar group.

Examples of the polar group include —COO⁻, —SO₃⁻, —NH₄⁺; a carboxyl group, a hydroxyl group, an amino group, and a sulfo group (—SO₃H).

Examples of the structural unit (Tc1) include structural units represented by chemical formulas shown below.

The structural unit represented by the chemical formula (Tc1-1) is a structural unit which, in the presence of a basic component, exhibits increased polarity upon heating. The structural unit represented by the chemical formula (Tc1-2) is a structural unit which exhibits reduced polarity upon heating.

[Chemical formula 19]

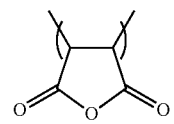

(Tc1-1)

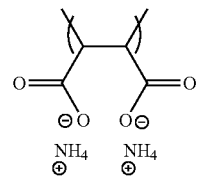

(Tc1-2)

The structural unit (Tc1) within the polymeric compound may be a single type of structural unit or a combination of two or more types.

Which one to select between a structural unit which exhibits increased polarity upon heating and a structural unit which exhibits reduced polarity upon heating, as the structural unit (Tc1), can be determined appropriately in accordance with factors such as the type of block copolymer, and the size of the surface energy of the layer containing the block copolymer.

Among the various possibilities for the structural unit (Tc1), the use of a structural unit represented by the above chemical formula (Tc1-1) or a structural unit represented by the chemical formula (Tc1-2) is preferable.

The proportion of the structural unit (Tc1) within the polymeric compound, with respect to the total of all the structural units that constitute the polymeric compound, is preferably 10 mol % to 90 mol %, more preferably 30 mol % to 80 mol %, and still more preferably 40 mol % to 80 mol %.

By ensuring that the proportion of the structural unit (Tc1) satisfies the above preferred range, the surface energy of the layer containing the block copolymer can be more easily maintained at an appropriate level during phase separation.

The polymeric compound used in the top coat material (1) may have one or more structural units other than the structural unit (Tc1).

Examples of these structural units other than the structural unit (Tc1) include the above-described structural unit (Tc2) which controls the surface energy of the layer containing the block copolymer, and a structural unit (Tc3) which adjusts the glass transition temperature (Tg).

Structural Unit (Tc2)

The structural unit (Tc2) is the same as the structural unit (Tc2) described below in the section entitled <Top Coat Material (2)>.

The structural unit (Tc2) within the polymeric compound may be a single type of structural unit or a combination of two or more types.

Among the various possibilities for the structural unit (Tc2), the use of at least one structural unit selected from the group consisting of structural units represented by the following general formula (Tc2-1), structural units represented by the following general formula (Tc2-2), and structural units represented by the following general formula (Tc2-3) is preferable, and the use of at least one structural unit selected from the group consisting of structural units represented by the general formula (Tc2-1) and structural units represented by the general formula (Tc2-2) is more preferable.

When the polymeric compound includes the structural unit (Tc2), the proportion of the structural unit (Tc2) within the polymeric compound, with respect to the total of all the structural units that constitute the polymeric compound, is preferably 10 mol % to 90 mol %, more preferably 20 mol % to 70 mol %, and still more preferably 20 mol % to 60 mol %.

By ensuring that the proportion of the structural unit (Tc2) satisfies the above preferred range, the surface energy of the layer containing the block copolymer can be easily controlled.

In the top coat material (1), either a single type of the polymeric compound having the structural unit (Tc1) may be used alone, or a combination of two or more types of the polymeric compound may be used.

The polymeric compound used in the top coat material (1) is a polymer containing at least the structural unit (Tc1), and is preferably a copolymer containing the structural unit (Tc2) in addition to the structural unit (Tc1).

Among such copolymers, examples of preferable copolymers include copolymers having a repeating structure formed of a structural unit represented by the chemical formula (Tc1-1) shown above, a structural unit represented by the following general formula (Tc2-1), and a structural unit represented by the following general formula (Tc2-2).

Specific examples of favorable polymeric compounds for use in the top coat material (1) include the same polymeric compounds as those specifically described below within the following description entitled <Top Coat Material (2)>.

The mass average molecular weight (Mw) (the polystyrene equivalent value determined by gel permeation chromatography (GPC)) of the polymeric compound used in the top coat material (1) is not particularly limited, but is preferably 1,000 to 50,000, more preferably 1,500 to 30,000, and most preferably 2,000 to 30,000. Ensuring that the mass average molecular weight satisfies the above preferable range improves the solubility of the polymeric compound in solvents.

The molecular weight dispersity index (Mw/Mn) of the polymeric compound, which is not particularly limited, is preferably 1.0 to 6.0, more preferably 1.0 to 5.0, and most preferably 1.0 to 4.0.

The polymeric compound can be produced, for example, by polymerizing the monomers that give rise to each of the structural units by a known radical polymerization or the like using a radical polymerization initiator such as azobisisobutyronitrile (AIBN) or dimethyl azobisisobutyrate.

The content of the polymeric compound within the top coat material (1) may be adjusted in accordance with the thickness of the top coat film to be formed or the like. The concentration of the polymeric compound within the top coat material (1) is preferably 0.1% by mass to 15% by mass, and more preferably 0.2% by mass to 7% by mass.

Surface Energy Control Agent

In addition to the polymeric compound having the above-described structural unit (Tc1), the top coat material (1) also contains a surface energy control agent which controls the surface energy of the layer containing the block copolymer described above in the section entitled Method of Producing Structure Containing Phase-Separated Structure.

By including this surface energy control agent, the surface energy of the layer containing the block copolymer can be controlled at an appropriate level during phase separation.

Examples of the surface energy control agent include components (crosslinking agents) which, upon heating, form chemical bonds either between the polymeric compounds within the top coat material or within individual polymeric compounds.

Specific examples of the surface energy control agent include crosslinking agents such as diamines and triamines, and among the various possibilities, the use of a diamine or a triamine is preferable, and the use of a diamine is particularly preferable.

Specific examples of preferred surface energy control agents include the compounds shown below.

[Chemical formula 20]

(Sc-1)

(Sc-2)

(Sc-3)

(Sc-4)

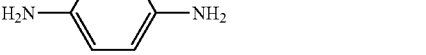

(Sc-5)

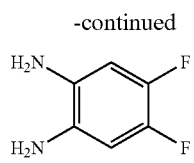

(Sc-6)

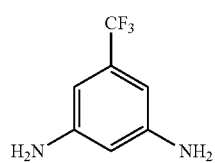

(Sc-7)

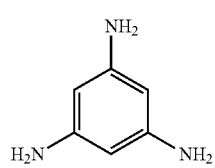

(Sc-8)

In the top coat material (1), a single surface energy control agent may be used alone, or a combination of two or more types of surface energy control agents may be used.

In the top coat material (1), the content of the surface energy control agent is preferably 2 parts by mass to 500 parts by mass, and more preferably 5 parts by mass to 300 parts by mass, per 100 parts by mass of the above-described polymeric compound.

Provided the content of the surface energy control agent is at least as large as the preferable lower limit, the surface energy of the layer containing the block copolymer can be controlled with ease. On the other hand, provided the content is less than or equal to the preferable upper limit value, the film formability further improves.

Optional Components

If desired, the top coat material (1) may also include other miscible additives and the like in addition to the above-described polymeric compound and the surface energy control agent.

Solvent

The top coat material (1) can be produced by dissolving the polymeric compound and the surface energy control agent described above in a solvent.

This solvent may be any solvent capable of dissolving the components used to form a uniform solution, and examples include water, ammonia water (preferably 10% by mass to 50% by mass), methanol, mixed solvents of ammonia water and methanol, mixed solvents of water and methanol, and mixed solvents of ammonia water and ethanol.

Top Coat Material (2)

The top coat material (2) contains a polymeric compound having a structural unit (Tc1) which undergoes a change in polarity upon heating and a structural unit (Tc2) which controls the surface energy of the layer containing the block copolymer.

Polymeric Compound

The polymeric compound used in the top coat material (2) has a structural unit (Tc1) which undergoes a change in polarity upon heating, and a structural unit (Tc2) which controls the surface energy of the layer containing the block copolymer.

Structural Unit (Tc1)

The structural unit (Tc1) is the same as the structural unit (Tc1) described above in the section entitled <Top Coat Material (1)>.

The structural unit (Tc1) within the polymeric compound may be a single type of structural unit or a combination of two or more types.

Which one to select between a structural unit which exhibits increased polarity upon heating and a structural unit which exhibits reduced polarity upon heating, as the structural unit (Tc1), can be determined appropriately in accordance with factors such as the type of block copolymer, and the size of the surface energy of the layer containing the block copolymer.

Among the various possibilities for the structural unit (Tc1), the use of a structural unit represented by the above chemical formula (Tc1-1) or a structural unit represented by the chemical formula (Tc1-2) is preferable.

The proportion of the structural unit (Tc1) within the polymeric compound, with respect to the total of all the structural units that constitute the polymeric compound, is preferably 10 mol % to 90 mol %, more preferably 30 mol % to 80 mol %, and still more preferably 40 mol % to 80 mol %.

By ensuring that the proportion of the structural unit (Tc1) satisfies the above preferred range, the surface energy of the layer containing the block copolymer can be easily maintained at an appropriate level during phase separation.

Structural Unit (Tc2)

The structural unit (Tc2) is a structural unit which controls the surface energy of the layer containing the block copolymer.

By including the structural unit (Tc2), the surface energy of the layer containing the block copolymer can be controlled at an appropriate level during phase separation.

The structural unit (Tc2) may be any unit capable of adjusting the polarity of the polymeric compound containing the above-described structural unit (Tc1), but is preferably at least one structural unit selected from the group consisting of structural units represented by the following general formula (Tc2-1), structural units represented by the following general formula (Tc2-2), and structural units represented by the following general formula (Tc2-3).

[Chemical formula 21]

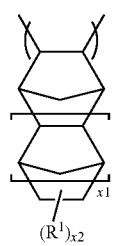

(Tc2-1)

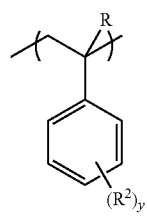

(Tc2-2)

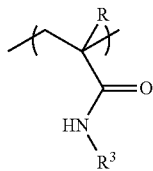
(Tc2-3)

[In the formula, x1 represents 0 or 1, $R^1$ represents a fluorine atom, or a hydrocarbon group which may contain a fluorine atom or an oxygen atom, x2 is an integer of 0 to 4, R represents a hydrogen atom, an alkyl group of 1 to 5 carbon atoms or a halogenated alkyl group of 1 to 5 carbon atoms, the plurality of R groups may be the same or different, $R^2$ represents a fluorine atom, or a hydrocarbon group which may contain a fluorine atom or an oxygen atom, y is an integer of 0 to 3, and $R^3$ represents a hydrocarbon group which may be substituted with a substituent, wherein the substituent in $R^3$ is a fluorine atom, or a hydrocarbon group which may contain a fluorine atom or an oxygen atom.]

In the formula (Tc2-1), x1 represents 0 or 1.

Moreover, x2 represents an integer of 0 to 4, and is preferably an integer of 0 to 2, more preferably 0 or 1, and particularly preferably 1.

In formula (Tc2-1), $R^1$ represents a fluorine atom, or a hydrocarbon group which may contain a fluorine atom or an oxygen atom. The hydrocarbon group for $R^1$ may be an aliphatic hydrocarbon group or an aromatic hydrocarbon group, but is preferably an aliphatic hydrocarbon group, and more preferably a monovalent aliphatic saturated hydrocarbon group (alkyl group).

More specific examples of this alkyl group include chain-like aliphatic hydrocarbon groups (linear or branched alkyl groups), and aliphatic hydrocarbon groups that include a ring within the structure.

The linear alkyl group contains preferably 1 to 8 carbon atoms, more preferably 1 to 5 carbon atoms, and still more preferably 1 to 3 carbon atoms. Specific examples include a methyl group, an ethyl group, an n-propyl group, an n-butyl group, and an n-pentyl group. Among these, a methyl group, an ethyl group, or an n-propyl group is preferable, and a methyl group or an ethyl group is particularly preferable.

The branched alkyl group contains preferably 3 to 10 carbon atoms, more preferably 3 to 8 carbon atoms, and still more preferably 3 to 6 carbon atoms.

Examples of the aliphatic hydrocarbon group that includes a ring within the structure include cyclic aliphatic hydrocarbon groups (groups in which one hydrogen atom has been removed from an aliphatic hydrocarbon ring), groups in which such a cyclic aliphatic hydrocarbon group is bonded to the terminal of the above-described chain-like aliphatic hydrocarbon group, and groups in which such a cyclic aliphatic hydrocarbon group is interposed within the chain of the above-described chain-like aliphatic hydrocarbon group.

The cyclic aliphatic hydrocarbon group contains preferably 3 to 8 carbon atoms, and more preferably 4 to 6 carbon atoms, and may be either a polycyclic group or a monocyclic group. The monocyclic group is preferably a group in which one or more hydrogen atoms have been removed from a monocycloalkane of 3 to 6 carbon atoms, and examples of the monocycloalkane include cyclopentane and cyclohexane. The polycyclic group is preferably a group in which one or more hydrogen atoms have been removed from a polycycloalkane of 7 to 12 carbon atoms, and specific examples of the polycycloalkane include adamantane, norbornane, isobornane, tricyclodecane, and tetracyclododecane.

The chain-like aliphatic hydrocarbon group or the cyclic aliphatic hydrocarbon group may include a fluorine atom or an oxygen atom. In other words, a hydrogen atom of the aliphatic hydrocarbon group may be substituted with a fluorine atom. Further, a methylene group (—$CH_2$—) of the aliphatic hydrocarbon group may be substituted with an oxygen atom (—O—) or a carbonyl group (—C(=O)—).

When the monovalent hydrocarbon group for $R^1$ is an aromatic hydrocarbon group, the aromatic hydrocarbon group is a monovalent hydrocarbon group having at least one aromatic ring.

There are no particular limitations on this aromatic ring, provided it is a cyclic conjugated system having $4n+2\pi$ electrons, and the aromatic ring may be either monocyclic or polycyclic. The aromatic ring contains preferably 5 to 30 carbon atoms, more preferably 5 to 20 carbon atoms, still more preferably 6 to 15 carbon atoms, and particularly preferably 6 to 12 carbon atoms. However, this number of carbon atoms does not include any carbon atoms within any of the substituents described below.

Specific examples of the aromatic ring include aromatic hydrocarbon rings such as benzene, naphthalene, anthracene, and phenanthrene, and aromatic heterocyclic rings in which a portion of the carbon atoms that constitute one of the above aromatic hydrocarbon rings has been substituted with a hetero atom. Examples of the hetero atom in the aromatic heterocyclic ring include an oxygen atom, a sulfur atom, and a nitrogen atom. Specific examples of the aromatic heterocyclic ring include a pyridine ring and a thiophene ring.

Specific examples of the aromatic hydrocarbon group include groups in which one hydrogen atom has been removed from the above aromatic hydrocarbon ring or aromatic heterocyclic ring (namely, aryl groups or heteroaryl groups), groups in which one hydrogen atom has been removed from an aromatic compound having two or more aromatic rings (such as biphenyl or fluorene), and groups in which one of the hydrogen atoms of the above-described aromatic hydrocarbon ring or aromatic heterocyclic ring has been substituted with an alkylene group (for example, arylalkyl groups such as a benzyl group, phenethyl group, 1-naphthylmethyl group, 2-naphthylmethyl group, 1-naphthylethyl group, or 2-naphthylethyl group).

The alkylene group bonded to the aryl group or heteroaryl group contains preferably 1 to 4 carbon atoms, more preferably 1 or 2 carbon atoms, and particularly preferably 1 carbon atom.

The aromatic hydrocarbon group may include a fluorine atom or an oxygen atom. In other words, a hydrogen atom of the aromatic hydrocarbon group may be substituted with a fluorine atom. Further, a methylene group (—$CH_2$—) of the aromatic hydrocarbon group may be substituted with an oxygen atom (—O—) or a carbonyl group (—C(=O)—).

In the above formulas (Tc2-2) and (Tc2-3), R represents a hydrogen atom, an alkyl group of 1 to 5 carbon atoms, or a halogenated alkyl group of 1 to 5 carbon atoms, and the plurality of R groups may be the same or different.

The alkyl group of 1 to 5 carbon atoms for R is preferably a linear or branched alkyl group of 1 to 5 carbon atoms, and specific examples include a methyl group, an ethyl group, a propyl group, an isopropyl group, an n-butyl group, an isobutyl group, a tert-butyl group, a pentyl group, an isopentyl group, and a neopentyl group. The halogenated alkyl group of 1 to 5 carbon atoms is a group in which a part or all of the hydrogen atoms of the above-described alkyl group of 1 to 5 carbon atoms have each been substituted with a halogen atom. Examples of the halogen atom include a fluorine atom, chlorine atom, bromine atom, and iodine atom, and a fluorine atom is particularly preferable.

R is preferably a hydrogen atom, an alkyl group of 1 to 5 carbon atoms or a fluorinated alkyl group of 1 to 5 carbon atoms, and from the viewpoint of ease of industrial availability, is most preferably a hydrogen atom or a methyl group.

In formula (Tc2-2), examples of $R^2$ include the same groups as those described above for $R^1$ in the formula (Tc2-1).

Further, y represents an integer of 0 to 3, and is preferably an integer of 0 to 2, more preferably 1 or 2, and particularly preferably 1.

In the formula (Tc2-3), $R^3$ represents a hydrocarbon group which may be substituted with a substituent.

Examples of the hydrocarbon group for $R^3$ include the same groups as those described above for the hydrocarbon group for $R^1$ in the formula (Tc2-1).

The substituent within $R^3$ is a fluorine atom or a hydrocarbon group which may contain a fluorine atom or an oxygen atom, and specific examples include the same substituents as those described above within the description for $R^1$ in the above formula (Tc2-1).

Specific examples of the structural unit represented by the above formula (Tc2-1) are shown below.

In the formulas, $R^{11}$ represents a hydrogen atom, or a hydrocarbon group which may contain a fluorine atom. Examples of the hydrocarbon group for $R^{11}$ include the same groups as those described above for the hydrocarbon group for $R^1$ in the formula (Tc2-1). In the following chemical formula, a wavy line refers to both "wedge-shaped bond" and "dashed line bond".

[Chemical formula 22]

(Tc2-1-1)

(Tc2-1-2)

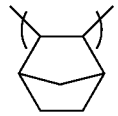

(Tc2-1-3)

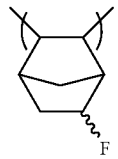

(Tc2-1-4)

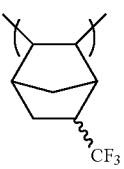

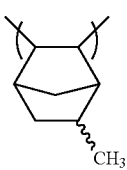

(Tc2-1-5)

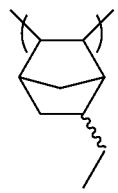

(Tc2-1-6)

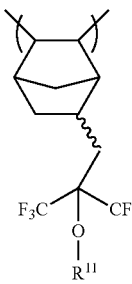

(Tc2-1-7)

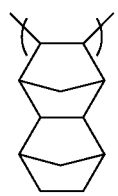

(Tc2-1-8)

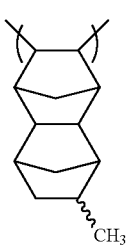

(Tc2-1-9)

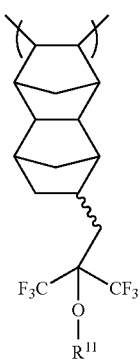

Specific examples of the structural unit represented by the above formula (Tc2-2) are shown below. In each of the following formulas, Ra represents a hydrogen atom, a methyl group, or a trifluoromethyl group.

In the formulas, $R^{12}$ represents a hydrogen atom, or a hydrocarbon group which may contain a fluorine atom. Examples of the hydrocarbon group for $R^{12}$ include the same groups as those described above for the hydrocarbon group for $R^1$ in the formula (Tc2-1).

[Chemical formula 23]

(Tc2-2-1) 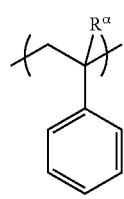

(Tc2-2-2) 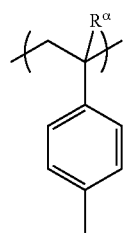

(Tc2-2-3) 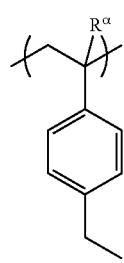

(Tc2-2-4) 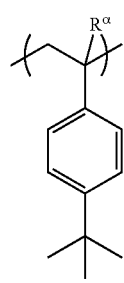

(Tc2-2-5) 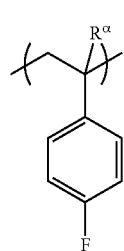

(Tc2-2-6) 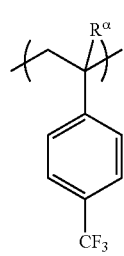

(Tc2-2-7) 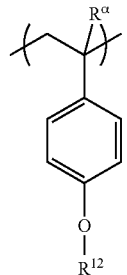

(Tc2-2-8) 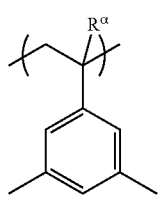

(Tc2-2-9) 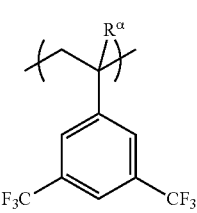

(Tc2-2-10) 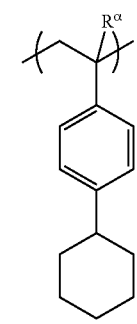

Specific examples of the structural unit represented by the above formula (Tc2-3) are shown below. In each of the following formulas, Ra represents a hydrogen atom, a methyl group, or a trifluoromethyl group.

In the formulas, $R^{13}$ represents a hydrogen atom, or a hydrocarbon group which may contain a fluorine atom. Examples of the hydrocarbon group for $R^{13}$ include the same groups as those described above for the hydrocarbon group for $R^1$ in the formula (Tc2-1).

[Chemical formula 24]

(Tc2-3-1) 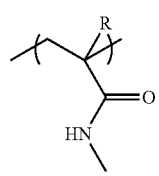

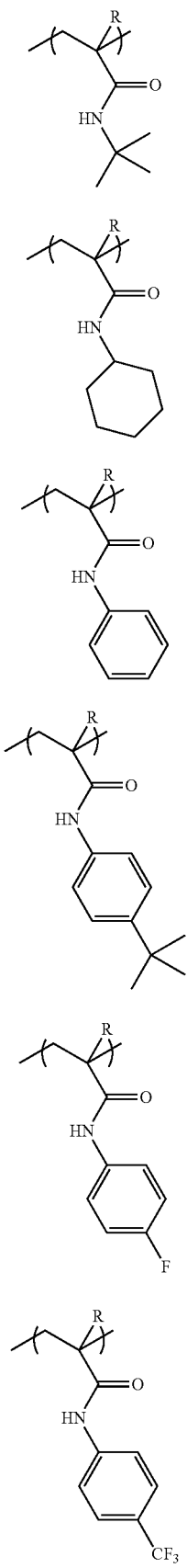

(Tc2-3-2)
(Tc2-3-3)
(Tc2-3-4)
(Tc2-3-5)
(Tc2-3-6)
(Tc2-3-7)

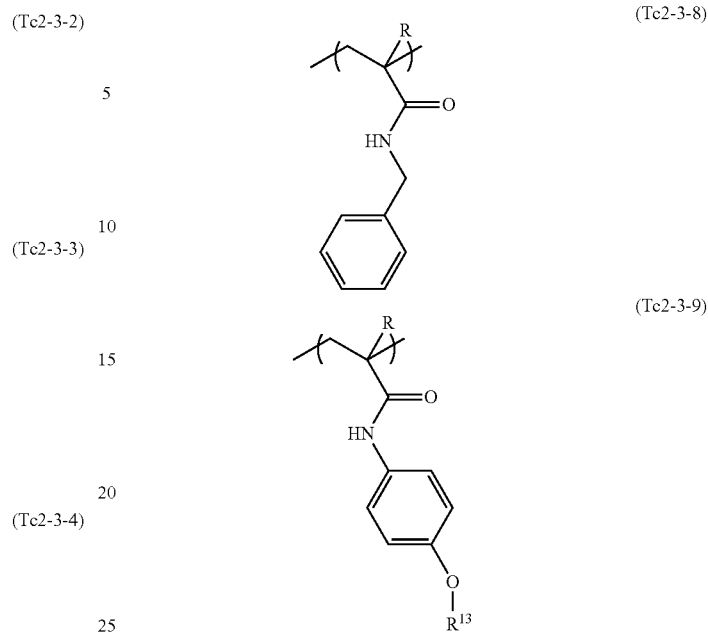

(Tc2-3-8)
(Tc2-3-9)

The structural unit (Tc2) within the polymeric compound may be a single type of structural unit or a combination of two or more types.

Among the various possibilities for the structural unit (Tc2), the use of at least one structural unit selected from the group consisting of structural units represented by the general formula (Tc2-1), structural units represented by the general formula (Tc2-2), and structural units represented by the general formula (Tc2-3) is preferable, and the use of at least one structural unit selected from the group consisting of structural units represented by the general formula (Tc2-1) and structural units represented by the general formula (Tc2-2) is more preferable.

The proportion of the structural unit (Tc2) within the polymeric compound, with respect to the total of all the structural units that constitute the polymeric compound, is preferably 10 mol % to 90 mol %, more preferably 20 mol % to 70 mol %, and still more preferably 20 mol % to 60 mol %.

By ensuring that the proportion of the structural unit (Tc2) satisfies the above preferred range, the surface energy of the layer containing the block copolymer can be easily controlled.

The polymeric compound used in the top coat material (2) may include a structural unit other than the structural unit (Tc1) and the structural unit (Tc2).

An example of a structural unit other than the structural unit (Tc1) and the structural unit (Tc2) is the structural unit (Tc3) which adjusts the glass transition temperature (Tg).

In the top coat material (2), the polymeric compound having the structural unit (Tc1) and the structural unit (Tc2) may be a single type of compound or a combination of two or more types of compounds.

The polymeric compound used in the top coat material (2) is a copolymer containing at least the structural unit (Tc1) and the structural unit (Tc2).

Specific examples of this copolymer include a copolymer having a repeating structure formed of a structural unit represented by the chemical formula (Tc1-2) and a structural unit represented by the general formula (Tc2-1); a copolymer having a repeating structure formed of a structural unit represented by the chemical formula (Tc1-2) and a structural unit represented by the general formula (Tc2-2); a copolymer having a repeating structure formed of a structural unit represented by the chemical formula (Tc1-2) and a structural unit represented by the general formula (Tc2-3); a copolymer having a repeating structure formed of a structural unit represented by the chemical formula (Tc1-2), a structural unit represented by the general formula (Tc2-1), and a structural unit represented by the general formula (Tc2-2); a copolymer having a repeating structure formed of a structural unit represented by the chemical formula (Tc1-2), a structural unit represented by the general formula (Tc2-1), and a structural unit represented by the general formula (Tc2-3); a copolymer having a repeating structure formed of a structural unit represented by the chemical formula (Tc1-2), a structural unit represented by the general formula (Tc2-2), and a structural unit represented by the general formula (Tc2-3); and a copolymer having a repeating structure formed of a structural unit represented by the chemical formula (Tc1-1), a structural unit represented by the general formula (Tc2-1), and a structural unit represented by the general formula (Tc2-2) Among these, a copolymer having a repeating structure formed of a structural unit represented by the chemical formula (Tc1-1), a structural unit represented by the general formula (Tc2-1) and a structural unit represented by the general formula (Tc2-2) is more preferable.

Specific examples of preferable polymeric compounds for use in the top coat material (2) are shown below.

In the formulas, $R^1$, $R^2$, $R^3$, and y are the same as $R^1$, $R^2$, $R^3$ and y respectively in the above-described formulas (Tc2-1) to (Tc2-3).

In the formulas, each of $R^{1a}$ and $R^{1b}$ independently is the same as $R^1$ in the formula (Tc2-1).

Each of $R^{2a}$ and $R^{2b}$ independently is the same as $R^2$ in the formula (Tc2-2).

Each of $y_1$ and $y_2$ independently is the same as y in the formula (Tc2-2).

Each of $R^{3a}$ and $R^{3b}$ independently is the same as $R^3$ in the formula (Tc2-3)

[Chemical formula 25]

(TC1)
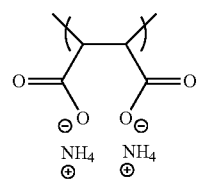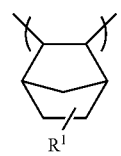

(TC2)
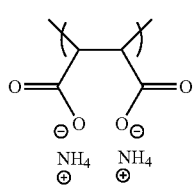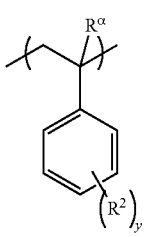

[Chemical formula 26]

(TC3)
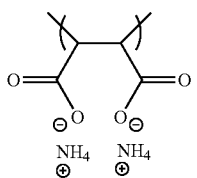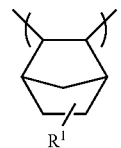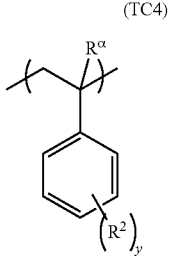

(TC4)
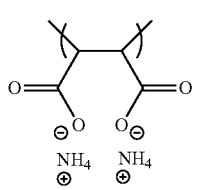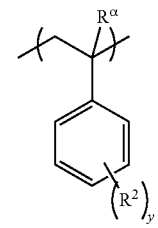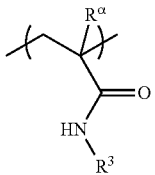

(TC5)
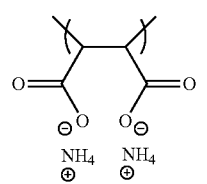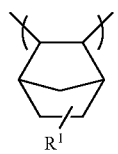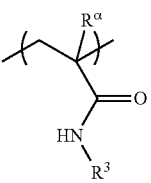

(TC6)
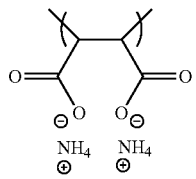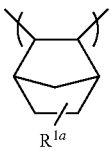

(TC7)
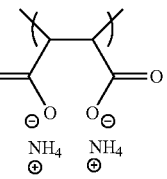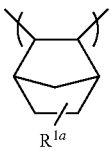

(TC8)
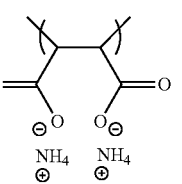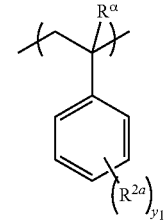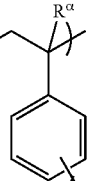

-continued

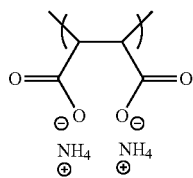
(TC9)

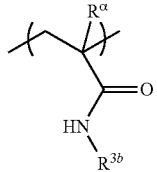

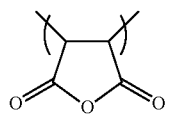
(TC10)

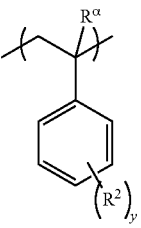

The mass average molecular weight (Mw) (the polystyrene equivalent value determined by gel permeation chromatography (GPC)) of the polymeric compound used in the top coat material (2) is not particularly limited, but is preferably 1,000 to 50,000, more preferably 1,500 to 30,000, and most preferably 2,000 to 30,000. Provided the mass average molecular weight satisfies the above preferable range, the polymeric compound exhibits satisfactory solubility in solvents.

The molecular weight dispersity index (Mw/Mn) of the polymeric compound, which is not particularly limited, is preferably 1.0 to 6.0, more preferably 1.0 to 5.0, and most preferably 1.0 to 4.0.

The polymeric compound can be produced, for example, by polymerizing the monomers that give rise to each of the structural units by a known radical polymerization or the like using a radical polymerization initiator such as azobisisobutyronitrile (AIBN) or dimethyl azobisisobutyrate.

The content of the polymeric compound within the top coat material (2) may be adjusted in accordance with the thickness of the top coat film to be formed or the like. The concentration of the polymeric compound within the top coat material (2) is preferably 0.1% by mass to 15% by mass, and more preferably 0.2% by mass to 7% by mass.

Optional Components

If desired, the top coat material (2) may also include other miscible additives, such as the above-described surface energy control agent, in addition to the polymeric compound described above.

Solvent

The top coat material (2) can be produced by dissolving the polymeric compound described above in a solvent.

This solvent may be any solvent capable of dissolving the components used to form a uniform solution, and examples include water, ammonia water (preferably 10% by mass to 50% by mass), methanol, mixed solvents of ammonia water and methanol, mixed solvents of water and methanol, and mixed solvents of ammonia water and ethanol.

If using the undercoat agent of the present invention, when phase-separating a layer containing a block copolymer having a block of a structural unit derived from an (α-substituted) acrylate ester, a vertical cylinder pattern or a vertical lamellar pattern can be excellently formed.

It is assumed that the reason is that the undercoat agent of the present invention can express optimal surface free energy for phase separating the layer containing the block copolymer.

EXAMPLE

Hereinafter, the present invention will be specifically described by the examples, but the present invention is not limited to the following examples.

Undercoat Agent

The following monomers (1) to (5) were used for synthesis in a molar ratio (here, in the undercoat agents 2, 3, 5, and 6, the charged molar ratio is described since the structural units of monomers (2) and (3) cannot be separated) shown in Table 1 to prepare resins 1 to 6, and each of the prepared resins 1 to 6 was dissolved in propylene glycol monomethyl ether acetate (PGMEA), whereby undercoat agents 1 to 6 having a solid content concentration of 1.0% by mass were prepared. In the following monomer (5), $R^0$ is an isobutyl group.

[Chemical formula 27]

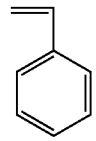
(1)

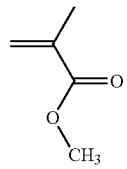
(2)

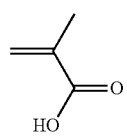
(3)

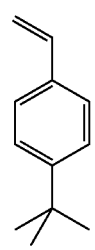
(4)

-continued (5)

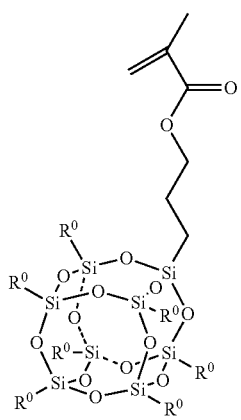

TABLE 1

| | | Undercoat agent | | | | | |
|---|---|---|---|---|---|---|---|
| | | 1 | 2 | 3 | 4 | 5 | 6 |
| Monomer | (1) | 97 | 60 | 25 | | | |
| | (2) | | 37 | 72 | | 77 | 51 |
| | (3) | 3 | 3 | 3 | 3 | 3 | 3 |
| | (4) | | | | 97 | | 46 |
| | (5) | | | | | 20 | |
| Mw | | 60000 | 60000 | 60000 | 60000 | 60000 | 60000 |
| Mw/Mn | | 1.5 | 1.5 | 1.5 | 1.5 | 1.5 | 1.5 |

Block Copolymers

A block copolymer (1) and a block copolymer (2) which are represented by the following chemical formula (BCP)-1 and have a different ratio (molar ratio) of the structural units from each other, a block copolymer (3) and a block copolymer (4) which are represented by the following chemical formula (BCP)-2 and have a different ratio (molar ratio) of the structural units from each other were used, respectively.

[Chemical formula 28]

(BCP)-1

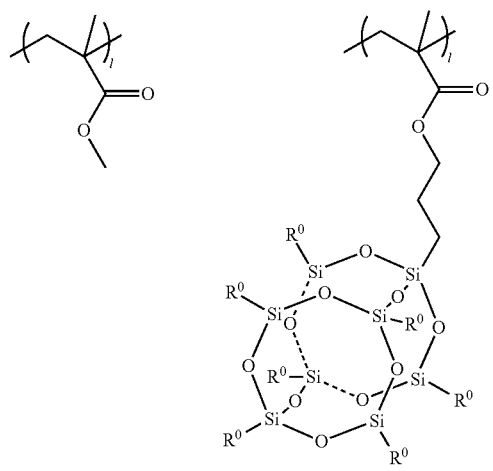

(BCP)-2

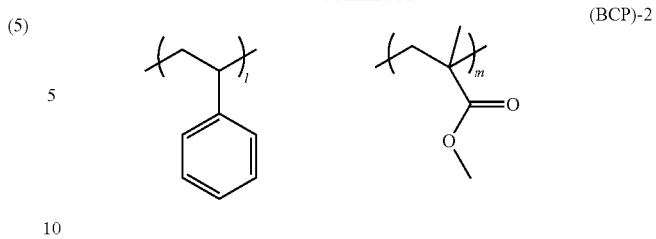

$R^0$ is an isobutyl group

Block copolymer (1): a cylinder-shaped phase-separated structure (period $L_0$=20 nm) is formed. The polystyrene equivalent mass average molecular weight (Mw) determined by gel permeation chromatography (GPC) was 20,000, and the molecular weight dispersity index (Mw/Mn) was 1.02. Further, the ratio (molar ratio) between the structural units, determined by $^{13}$C-NMR, was l/m=74/26.

A 2-heptanone solution containing the block copolymer (1) and 2-heptanone, in which a solid content concentration of the block copolymer (1) was 1.0% by mass was prepared, and this was used as the block copolymer (1).

Block copolymer (2): a lamellar phase-separated structure (period $L_0$=20 nm) is formed. The polystyrene equivalent mass average molecular weight (Mw) determined by GPC was 20,000, and the molecular weight dispersity index (Mw/Mn) was 1.02. Further, the ratio (molar ratio) between the structural units, determined by $^{13}$C-NMR, was l/m=95/5.

A 2-heptanone solution containing the block copolymer (2) and 2-heptanone, in which a solid content concentration of the block copolymer (2) was 1.0% by mass was prepared, and this was used as the block copolymer (2).

Block copolymer (3): a cylinder-shaped phase-separated structure (period $L_0$=24 nm) is formed. The polystyrene equivalent mass average molecular weight (Mw) determined by GPC was 35,000, and the molecular weight dispersity index (Mw/Mn) was 1.02. In addition, the ratio (molar ratio) between the structural units, determined by $^{13}$C-NMR, was l/m=75/25.

A PGMEA solution containing the block copolymer (3) and PGMEA, in which a solid content concentration of the block copolymer (3) was 2.0% by mass, was prepared, and this was used as the block copolymer (3).

Block copolymer 1 (Mw: 42,400, PS/PMMA composition ratio (molar ratio): 55/45, dispersity index: 1.07, and period: 26 nm)

Block copolymer (4): a lamellar phase-separated structure (period $L_0$=51 nm) is formed. The polystyrene equivalent mass average molecular weight (Mw) determined by GPC was 110,000, and the molecular weight dispersity index (Mw/Mn) was 1.02. Further, the ratio (molar ratio) between the structural units, determined by $^{13}$C-NMR, was l/m=55/45.

A PGMEA solution containing the block copolymer (4) and PGMEA, in which a solid content concentration of the block copolymer (4) was 2.0% by mass, was prepared, and this was used as the block copolymer (4).

Top Coat (TC) Material

TC material (2-1): a 1.5% by mass polymeric compound solution containing a polymeric compound represented by the following chemical formula (TC)-1, and a solvent (a mixed solvent of ammonia water:methanol=1:3 (mass ratio)).

[Chemical formula 29]

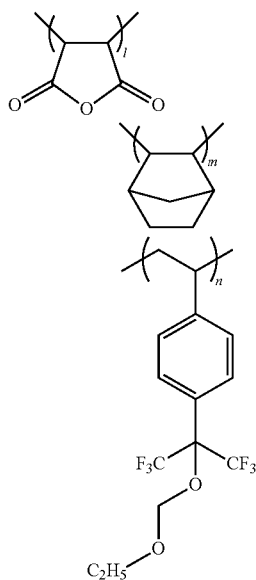

Polymeric compound represented by the chemical formula (TC)-1: The polystyrene equivalent mass-average molecular weight (Mw) determined by GPC measurement was 13,400, and the molecular weight dispersity index (Mw/Mn) was 2.7. In addition, the ratio (molar ratio) between the structural units, determined by $^{13}$C-NMR, was l/m/n=60/16/24.

Pattern Formation

Using the methods described below in each of the examples, layers of the block copolymers (1) to (4) were subjected to phase separation to produce a structure containing a phase-separated structure, and the phase formed of the block of the structural unit derived from methyl methacrylate was then selectively removed from the structure to form a pattern. Subsequently, the cross-sectional shape of the obtained pattern was observed, and an evaluation was made to determine whether a lamellar or cylinder-shaped phase-separated pattern arranged in the vertical direction with respect to the wafer surface is formed.

Comparative Examples 0 to 3 and Examples 1 and 2

Each of the undercoat agents shown in the following Table 2 was coated in a thickness of 20 nm on an 8-inch silicon wafer after a baking treatment (dehydration bake) was performed at 200° C. for 60 seconds (here, Comparative example 0 has no base material), and the resultant products were subjected to a baking treatment at 230° C. for 60 seconds. Thereafter, a rinse treatment was performed to remove the random copolymer which is not crosslinked using PGMEA, and a post bake was performed for drying at 90° C. for 60 seconds. Subsequently, the block copolymer (1) was spin-coated (rate of revolution: 1,500 rpm, for 60 seconds) on the wafer (Comparative example 0) or the undercoat agent (Comparative examples 1 to 3 and Examples 1 and 2), and a baking treatment was performed at 110° C. for 60 seconds, whereby a layer of the block copolymer (1) having a film thickness of 18 nm was formed.

The TC material (2-1) was coated on the layer of the block copolymer (1), whereby a top coat film having a film thickness of 57 nm was formed.

Then, the layer of the block copolymer (1) was phase-separated by thermal annealing at 180° C. for 1 hour in the atmosphere, and the top coat film was removed using a mixed solvent of ammonia water:methanol=1:3 (mass ratio), whereby a structure containing a phase-separated structure was obtained.

Subsequently, using TCA-3822 (product name, manufactured by Tokyo Ohka Kogyo Co., Ltd.), the structure was subjected to an oxygen plasma treatment (200 sccm, 40 Pa, 200 W, for 30 seconds, 40° C.), thereby selectively removing, from the structure, the phase formed of the block of the structural unit derived from methyl methacrylate, and thus forming a pattern.

The cross-sectional shape of the obtained pattern was observed using a scanning electron microscope (accelerating voltage: 800 V, product name: SU8000 manufactured by Hitachi High-Technologies Corporation). As a result, in Comparative examples 0 to 3, a lamellar or cylinder-shaped phase-separated pattern arranged in the vertical direction with respect to the wafer surface could not be confirmed, however, in Examples 1 and 2, a cylinder-shaped phase-separated pattern arranged in the vertical direction with respect to the wafer surface could be confirmed.

TABLE 2

| | Undercoat agent | BCP | Pattern shape |
|---|---|---|---|
| Comparative Example 0 | — | (1) | Phase-separated pattern cannot be confirmed |
| Comparative Example 1 | 1 | (1) | Phase-separated pattern cannot be confirmed |
| Comparative Example 2 | 2 | (1) | Phase-separated pattern cannot be confirmed |
| Comparative Example 3 | 3 | (1) | Phase-separated pattern cannot be confirmed |
| Example 1 | 4 | (1) | Vertical cylinder |
| Example 2 | 5 | (1) | Vertical cylinder |

Comparative Example 4 and Example 3

The undercoat agent 6 was coated in a thickness of 20 nm on an 8-inch silicon wafer after a baking treatment (dehydration bake) was performed at 200° C. for 60 seconds (here, Comparative example 4 has no base material), and the resultant product was subjected to a baking treatment at 230° C. for 60 seconds. Thereafter, a rinse treatment was performed to remove the random copolymer which is not crosslinked using PGMEA, and a post bake was performed for drying at 90° C. for 60 seconds. Subsequently, the block copolymer (2) was spin-coated (rate of revolution: 1,500 rpm, for 60 seconds) on the wafer (Comparative example 4) or the undercoat agent (Example 3), and a baking treatment was performed at 110° C. for 60 seconds, whereby a layer of the block copolymer (2) having a film thickness of 18 nm was formed.

Then, the layer of the block copolymer (2) was phase-separated by thermal annealing at 180° C. for 1 hour in the atmosphere, whereby a structure containing a phase-separated structure was obtained.

Subsequently, using TCA-3822 (product name, manufactured by Tokyo Ohka Kogyo Co., Ltd.), the structure was subjected to an oxygen plasma treatment (200 sccm, 40 Pa, 200 W, for 30 seconds, 40° C.), thereby selectively removing, from the structure, the phase formed of the block of the structural unit derived from methyl methacrylate, and thus forming a pattern.

The cross-sectional shape of the obtained pattern was observed using a scanning electron microscope (accelerating voltage: 800 V, product name: SU8000 manufactured by Hitachi High-Technologies Corporation). As a result, the formation of a lamellar phase-separated pattern was confirmed in which a proportion of arrangement in the vertical direction with respect to the wafer surface is higher in Example 3 than in Comparative examples 4.

Comparative Examples 5 and 6 and Examples 4 to 6

The undercoat agent 5 or 6 was coated in a thickness of 20 nm on an 8-inch silicon wafer after a baking treatment (dehydration bake) was performed at 200° C. for 60 seconds (here, Comparative examples 5 and 6 have no base material), and the resultant product was subjected to a baking treatment at 230° C. for 60 seconds. Thereafter, a rinse treatment was performed to remove the random copolymer which is not crosslinked using PGMEA, and a post bake was performed for drying at 90° C. for 60 seconds. Subsequently, each of the block copolymer (3) or (4) was spin-coated (rate of revolution: 1,500 rpm, for 60 seconds) on the wafer (Comparative examples 5 and 6) or the undercoat agent (Examples 4 to 6) by the combinations shown in the following Table 3, and a baking treatment was performed at 110° C. for 60 seconds, whereby a layer of the block copolymer (3) having a film thickness of 30 nm or a layer of the block copolymer (4) having a film thickness of 50 nm was formed.

Next, the layer of the block copolymer (3) was subjected to phase separation by thermal annealing at 180° C. for 600 seconds under a nitrogen gas flow or the layer of the block copolymer (4) was subjected to phase separation by thermal annealing at 240° C. for 600 seconds under a nitrogen gas flow, whereby a structure containing a phase-separated structure was obtained.

Subsequently, using TCA-3822 (product name, manufactured by Tokyo Ohka Kogyo Co., Ltd.), the structure was subjected to an oxygen plasma treatment (200 sccm, 40 Pa, 200 W, for 30 seconds, 40° C.), thereby selectively removing, from the structure, the phase formed of the block of the structural unit derived from methyl methacrylate, and thus forming a pattern.

The cross-sectional shape of the obtained pattern was observed using a scanning electron microscope (accelerating voltage: 800 V, product name: SU8000 manufactured by Hitachi High-Technologies Corporation). As a result, in Comparative examples 5 and 6, a cylinder-shaped or lamellar phase-separated pattern arranged in the vertical direction with respect to the wafer surface could not be confirmed, however, in Examples 4 to 6, a cylinder-shaped or lamellar phase-separated pattern arranged in the vertical direction with respect to the wafer surface could be confirmed.

TABLE 3

| | Undercoat agent | BCP | Pattern shape |
|---|---|---|---|
| Comparative Example 5 | Nil | (3) | Phase-separated pattern cannot be confirmed |
| Example 4 | 5 | (3) | Vertical cylinder |
| Example 5 | 6 | (3) | Vertical cylinder |
| Comparative Example 6 | Nil | (4) | Phase-separated pattern cannot be confirmed |
| Example 6 | 6 | (4) | Vertical lamellar |

As the results shown in the above, in a case of using the undercoat agent of the present invention, a phase-separated structure of a block copolymer having a block of a structural unit derived from an (α-substituted) acrylate ester and an excellent vertical pattern could be formed.

What is claimed is:

1. A method of producing a structure containing a phase-separated structure, comprising:
   coating an undercoat agent on a substrate to form a layer formed of the undercoat agent;
   forming a layer containing a block copolymer having a block of a structural unit derived from an (α-substituted) acrylate ester and a block of a polyhedral oligomeric silsesquioxane structure-containing structural unit or a structural unit derived from a styrene or derivative thereof on the layer formed of the undercoat agent; and
   phase-separating the layer containing the block copolymer,
   the undercoat agent comprising:
   a copolymer having a structural unit (ba0-1) represented by general formula (ba0-1) and a structural unit (ba0-3) selected from structural units represented by general formulae (ba0-3-1) to (ba0-3-4) shown below, or
   a copolymer having a structural unit (ba0-2) represented by general formula (ba0-2) and the structural unit (ba0-3):

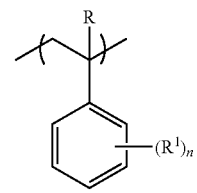

(ba0-1)

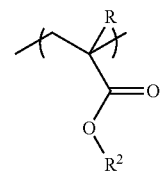

(ba0-2)

wherein in the formula (ba0-1), R represents a hydrogen atom, an alkyl group of 1 to 5 carbon atoms or a halogenated alkyl group of 1 to 5 carbon atoms, $R^1$ represents a t-butyl group; and wherein in the formula (ba0-2), R represents a hydrogen atom, an alkyl group of 1 to 5 carbon atoms or a halogenated alkyl group of 1 to 5 carbon atoms, and $R^2$ represents an organic group including a polyhedral oligomeric silsesquioxane structure selected from the group consisting of (ba0-3-1), (ba0-3-2), (ba0-3-3) and (ba0-3-4):

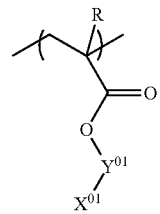

(ba0-3-1)

-continued (ba0-3-2)

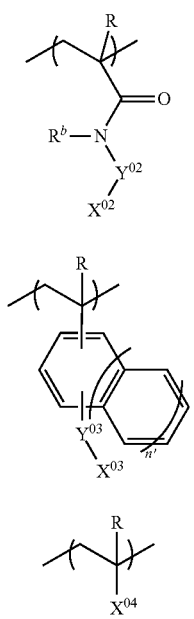

(ba0-3-3)

(ba0-3-4)

wherein R represents a hydrogen atom, an alkyl group of 1 to 5 carbon atoms or a halogenated alkyl group of 1 to 5 carbon atoms, $R^b$ represents a hydrogen atom or an alkyl group of 1 to 5 carbon atoms, $Y^{01}$ represents a divalent linking group, $Y^{02}$ represents a divalent linking group, $Y^{03}$ represents a single bond or a divalent linking group, and $X^{01}$ to $X^{04}$ each independently represents a carboxy group, a hydroxyl group, a cyano group, an azido group, an amino group, a trialkoxysilyl group, a dialkoxysilyl group, a monoalkoxy silyl group, a lactone-containing cyclic group, groups represented by the following formula (ba0-3-1'-r1) to (ba0-3-1'-r2), an ether-containing cyclic group, or a cyclooctatrienyl group:

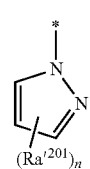

(ba0-3-1'-r1)

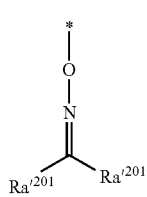

(ba0-3-1'-r2)

wherein $Ra'^{201}$ represents a hydrogen atom, an alkyl group of 1 to 10 carbon atoms, n is an integer of 1 to 3, and * represents a bond.

2. The method according to claim 1, wherein the polyhedral oligomeric silsesquioxane structure-containing structural unit is a structural unit represented by general formula (a0-1):

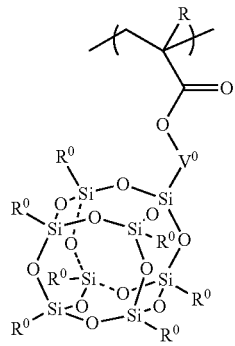

(a0-1)

wherein R represents a hydrogen atom, an alkyl group of 1 to 5 carbon atoms or a halogenated alkyl group of 1 to 5 carbon atoms, $V^0$ represents a divalent hydrocarbon group which may have a substituent, and $R^0$ represents a monovalent hydrocarbon group which may have a substituent, wherein the plurality of $R^0$ groups may be the same as or different from each other.

3. The method according to claim 1, wherein $R^2$ in general formula (ba0-2) is a group represented by general formula (a0-r-1) shown below:

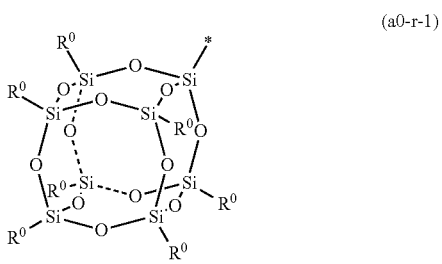

(a0-r-1)

wherein $R^0$ represents a monovalent hydrocarbon group which may have a substituent, wherein the plurality of $R^0$ groups may be the same as or different from each other, and * represents a bond.

4. The method according to claim 1, wherein the structural unit (ba0-2) is represented by general formula (a0-1) shown below:

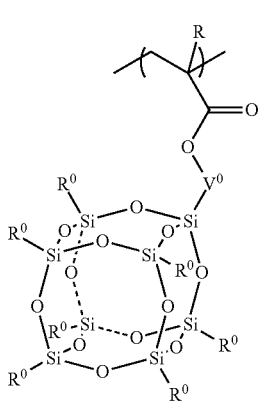

(a0-1)

wherein R represents a hydrogen atom, an alkyl group of 1 to 5 carbon atoms or a halogenated alkyl group of 1 to to 5 carbon atoms, $V^o$ represents a divalent hydrocarbon group which may have a substituent, and $R^o$ represents a monovalent hydrocarbon group which may have a substituent, wherein the plurality of $R^o$ groups may be the same as or different from each other.

* * * * *